US011972778B2

(12) United States Patent
Ling et al.

(10) Patent No.: US 11,972,778 B2
(45) Date of Patent: Apr. 30, 2024

(54) SOUND-PICTURE MATCHING METHOD OF VIDEO, RELATED APPARATUS, AND STORAGE MEDIUM

(71) Applicant: TENCENT TECHNOLOGY (SHENZHEN) COMPANY LIMITED, Shenzhen (CN)

(72) Inventors: Yonggen Ling, Shenzhen (CN); Haozhi Huang, Shenzhen (CN); Li Shen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 126 days.

(21) Appl. No.: 17/712,060

(22) Filed: Apr. 1, 2022

(65) Prior Publication Data

US 2022/0223182 A1 Jul. 14, 2022

Related U.S. Application Data

(63) Continuation of application No. PCT/CN2021/078367, filed on Mar. 1, 2021.

(30) Foreign Application Priority Data

Apr. 23, 2020 (CN) .......................... 202010326306.1

(51) Int. Cl.
*G11B 27/031* (2006.01)
*G10L 13/02* (2013.01)
(Continued)

(52) U.S. Cl.
CPC ............ *G11B 27/031* (2013.01); *G10L 13/02* (2013.01); *G10L 25/57* (2013.01); *G11B 27/34* (2013.01)

(58) Field of Classification Search
CPC ....... G11B 27/031; G11B 27/34; G10L 13/02; G10L 25/57
See application file for complete search history.

(56) References Cited

U.S. PATENT DOCUMENTS

| 7,623,755 B2 | 11/2009 | Kuspa |
| 8,655,152 B2 | 2/2014 | Marks et al. |

(Continued)

FOREIGN PATENT DOCUMENTS

| CN | 1971621 A | 5/2007 |
| CN | 101005574 A | 7/2007 |

(Continued)

OTHER PUBLICATIONS

The State Intellectual Property Office of the People's Republic of China (SIPO) Office Action 1 for for 202010326306.1 dated Jun. 11, 2020 12 Pages (including translation).

(Continued)

*Primary Examiner* — Sunghyoun Park
(74) *Attorney, Agent, or Firm* — ANOVA LAW GROUP PLLC

(57) ABSTRACT

A video sound-picture matching includes: acquiring a voice sequence; acquiring a voice segment from the voice sequence; acquiring an initial position of a start-stop mark and a moving direction of the start-stop mark from an image sequence; determining an active segment according to the initial position of the start-stop mark, the moving direction of the start-stop mark, and the voice segment; and synthesizing the voice segment and the active segment to obtain a video segment. In a video synthesizing process, the present disclosure uses start-stop marks to locate positions of active segments in an image sequence, so as to match the active segments having actions with voice segments, so that the synthesized video segments are more in line with natural (Continued)

laws of a character during speaking, and have better authenticity.

20 Claims, 17 Drawing Sheets

(51) Int. Cl.
G10L 25/57 (2013.01)
G11B 27/34 (2006.01)

(56) References Cited

U.S. PATENT DOCUMENTS

| 10,021,276 | B1 | 7/2018 | Chang | |
|---|---|---|---|---|
| 2013/0073961 | A1 | 3/2013 | Agnoli et al. | |
| 2013/0151965 | A1 | 6/2013 | Demiris | |
| 2018/0285456 | A1* | 10/2018 | Nichkawde | G06N 3/08 |
| 2018/0336930 | A1* | 11/2018 | Takahashi | H04N 21/8547 |
| 2022/0392439 | A1* | 12/2022 | Siohan | G10L 13/02 |

FOREIGN PATENT DOCUMENTS

| CN | 101523498 A | 9/2009 |
|---|---|---|
| CN | 101640057 A | 2/2010 |
| CN | 101937570 A | 1/2011 |
| CN | 104902317 A | 9/2015 |
| CN | 106067989 A | 11/2016 |
| CN | 107333071 A | 11/2017 |
| CN | 108305632 A | 7/2018 |
| CN | 108600680 A | 9/2018 |
| CN | 108924617 A | 11/2018 |
| CN | 109447234 A | 3/2019 |
| CN | 110062116 A | 7/2019 |
| CN | 110070065 A | 7/2019 |
| CN | 110087014 A | 8/2019 |
| CN | 110267113 A | 9/2019 |
| CN | 110493613 A | 11/2019 |
| CN | 110534109 A | 12/2019 |
| CN | 110598651 A | 12/2019 |
| CN | 110688911 A | 1/2020 |
| CN | 110781328 A | 2/2020 |
| CN | 110781349 A | 2/2020 |
| CN | 110830852 A | 2/2020 |
| CN | 111010589 A | 4/2020 |
| CN | 111225237 A | 6/2020 |
| EP | 1587111 A1 | 10/2005 |
| JP | H099224 A | 1/1997 |
| WO | 2013086607 A1 | 6/2013 |

OTHER PUBLICATIONS

The World Intellectual Property Organization (WIPO) International Search Report for PCT/CN2021/078367 dated May 21, 2021 5 Pages (including translation).
A. J. Hunt et al., "Unit selection in a concatenative speech synthesis system using a large speech database," IEEE International Conference on Acoustics, Speech, and Signal Processing Conference Proceedings, 1996. 4 pages.
A. W. Black et al., "Automatically clustering similar units for unit selection in speech synthesis," Proceedings of Eurospeech 97. Rhodes, Greece, 1997. 4 pages.
K. Tokuda et al., "Speech parameter generation algorithms for HMM-based speech synthesis," IEEE International Conference on Acoustics, Speech, and Signal Processing. Proceedings, 2000. 4 pages.
H. Zen et al., "Statistical parametric speech synthesis," speech communication, vol. 51, No. 11, 2009. 23 pages.
Y. Wang et al., "Tacotron: Towards end-to-end speech synthesis," arXiv preprint arXiv:1703.10135v2, Apr. 6, 2017. 10 pages.
J. Shen et al., "Natural TTS Synthesis by Conditioning WaveNet on Mel Spectrogram Predictions," arXiv:1712.05884v2, Feb. 16, 2018. 5 pages.
Guha Balakrishnan et al., "Synthesizing Images of Humans in Unseen Poses," The IEEE Conference on Computer Vision and Pattern Recognition, 2018, pp. 8340-8348. 9 pages.
European Patent Office European Search Report for Application No. 21792639.3 Mar. 31, 2023 9 pages.

* cited by examiner (A)

(B)

(A)

(B)

(A)

(B)

(A)

(B)

SOUND-PICTURE MATCHING METHOD OF VIDEO, RELATED APPARATUS, AND STORAGE MEDIUM

RELATED APPLICATION(S)

This application is a continuation application of PCT Patent Application No. PCT/CN2021/078367 filed on Mar. 1, 2021, which claims priority of the Chinese Patent Application No. 2020103263061 filed on Apr. 23, 2020 and entitled "SOUND-PICTURE MATCHING METHOD OF VIDEO, RELATED APPARATUS, AND STORAGE MEDIUM," all of which are incorporated herein by reference in entirety.

FIELD OF THE TECHNOLOGY

The present disclosure relates to the field of artificial intelligence, and in particular, to sound-picture matching technologies of videos.

BACKGROUND

With the development of science and technologies, computer vision technologies have been applied to many fields such as digital entertainment, medical treatment and health, and safe-protection monitoring. Synthesizing realistic visual content based on the computer vision technologies is of commercial values and is desirable in the industry.

Certain existing technologies use a method of generating videos through Generative Adversarial Networks (GANs). A known image texture is mapped to an unseen scenario by using a neural network, and images after the mapping are repaired and complemented to generate a desired video content.

However, a video content generated by the GAN often only includes an image sequence and does not include a voice content. Moreover, due to the lack of training data and the instability of a training method, the generated image sequence often has obvious flaws, resulting in a poor authenticity of the generated video content.

SUMMARY

Embodiments of the present disclosure provide a video sound-picture matching method, a related apparatus, and a storage medium. Start-stop marks may be used for locating positions of active segments in an image sequence in a video synthesizing process, so as to match the active segments having actions with voice segments. In this way, it can be ensured that the synthesized video segments have a more realistic visual effect, that is, a scenario of a character speaking in the video segments is more realistic and is close to the effect of the character speaking in a real scenario, which is difficult for people to recognize that the voices and images in the video segments are synthesized. In addition, moving directions of the start-stop marks can be used for matching the voice segments and the active segments in an orderly manner, which can improve the consistency and continuity of actions and voices in the synthesized video segments.

In one aspect, the present disclosure provides a video sound-picture matching method, including: acquiring a voice sequence, the voice sequence including M voice segments, and M being an integer greater than or equal to 1; acquiring a voice segment from the voice sequence, the voice segment being any voice segment in the voice sequence; acquiring an initial position of a start-stop mark and a moving direction of the start-stop mark from an image sequence, the image sequence including N active segments, each active segment including an action picture of an object, the initial position of the start-stop mark being a start frame of the active segment or an end frame of the active segment, and N being an integer greater than or equal to 1; determining an active segment according to the initial position of the start-stop mark, the moving direction of the start-stop mark, and the voice segment; and synthesizing the voice segment and the active segment to obtain a video segment, the video segment including the action picture of the object and a voice of the object.

In another aspect, the present disclosure provides a video sound-picture matching apparatus, comprising: a memory storing computer program instructions; and a processor coupled to the memory and configured to execute the computer program instructions and perform: acquiring a voice sequence, the voice sequence including M voice segments, and M being an integer greater than or equal to 1; acquiring a voice segment from the voice sequence, the voice segment being to any voice segment in the voice sequence; acquiring an initial position of a start-stop mark and a moving direction of the start-stop mark from an image sequence, the image sequence including N active segments, each active segment including an action picture of an object, the initial position of the start-stop mark being a start frame of the active segment or an end frame of the active segment, and N being an integer greater than or equal to 1; determining an active segment according to the initial position of the start-stop mark, the moving direction of the start-stop mark, and the voice segment; and synthesizing the voice segment and the active segment to obtain a video segment, the video segment including the action picture of the object and a voice of the object.

In yet another aspect, the present disclosure provides a non-transitory computer-readable storage medium storing computer program instructions executable by at least one processor to perform: acquiring a voice sequence, the voice sequence including M voice segments, and M being an integer greater than or equal to 1; acquiring a voice segment from the voice sequence, the voice segment being to any voice segment in the voice sequence; acquiring an initial position of a start-stop mark and a moving direction of the start-stop mark from an image sequence, the image sequence including N active segments, each active segment including an action picture of an object, the initial position of the start-stop mark being a start frame of the active segment or an end frame of the active segment, and N being an integer greater than or equal to 1; determining an active segment according to the initial position of the start-stop mark, the moving direction of the start-stop mark, and the voice segment; and synthesizing the voice segment and the active segment to obtain a video segment, the video segment including the action picture of the object and a voice of the object.

In yet another aspect, the present disclosure provides a computing device, including: a memory, a transceiver, a processor, and a bus system, the memory being configured to store a program; the processor being configured to execute the program in the memory to perform the method in the aspects; and the bus system being configured to connect the memory and the processor, to enable the memory and the processor to perform communication.

As can be seen from the technical solutions, the embodiments of the present disclosure may provide one or more of the following advantages:

In the sound-picture matching method of a video provided by the embodiments of the present disclosure, a voice sequence transmitted by a client is first received, and then a to-be-matched voice segment is acquired from the voice sequence. An initial position of a start-stop mark and a moving direction of the start-stop mark are acquired from an image sequence, and a to-be-matched active segment is determined according to the initial position of the start-stop mark, the moving direction of the start-stop mark, and the to-be-matched voice segment. Finally, the to-be-matched voice segment and the to-be-matched active segment are synthesized to obtain a video segment. Through the above method, in a video synthesizing process, positions of active segments in an image sequence are located by positions of start-stop marks, so as to match the active segments having actions with voice segments. In this way, it can be ensured that the synthesized video segments have a more realistic visual effect, that is, a scenario of a character speaking in the video segments is more realistic and is close to the effect of the character speaking in a real scenario, which is difficult for people to recognize that the voices and images in the video segments are synthesized. In addition, moving directions of the start-stop marks can be used for matching the voice segments and the active segments in an orderly manner, which can improve the consistency and continuity of actions and voices in the synthesized video segments.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DESCRIPTION OF EMBODIMENTS

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

The sound-picture matching method provided in the present disclosure is applied to a scenario of synthesizing a video, that is, a video including voice information and image information can be synthesized, and an implementation such as a virtual idol, a virtual commentator, or a virtual teacher can be realized based on the video. For example, in a scenario of realizing a virtual commentator, a video including an image sequence having speaking actions may be acquired. A voice sequence is then acquired, which may be pre-recorded, real-time collected, or obtained after text conversion. Then, the sound-picture matching method provided in the present disclosure is adopted to correspond the voice sequence to the image sequence in the video, so as to synthesize a corresponding video to realize the virtual commentator.

Figure 1:
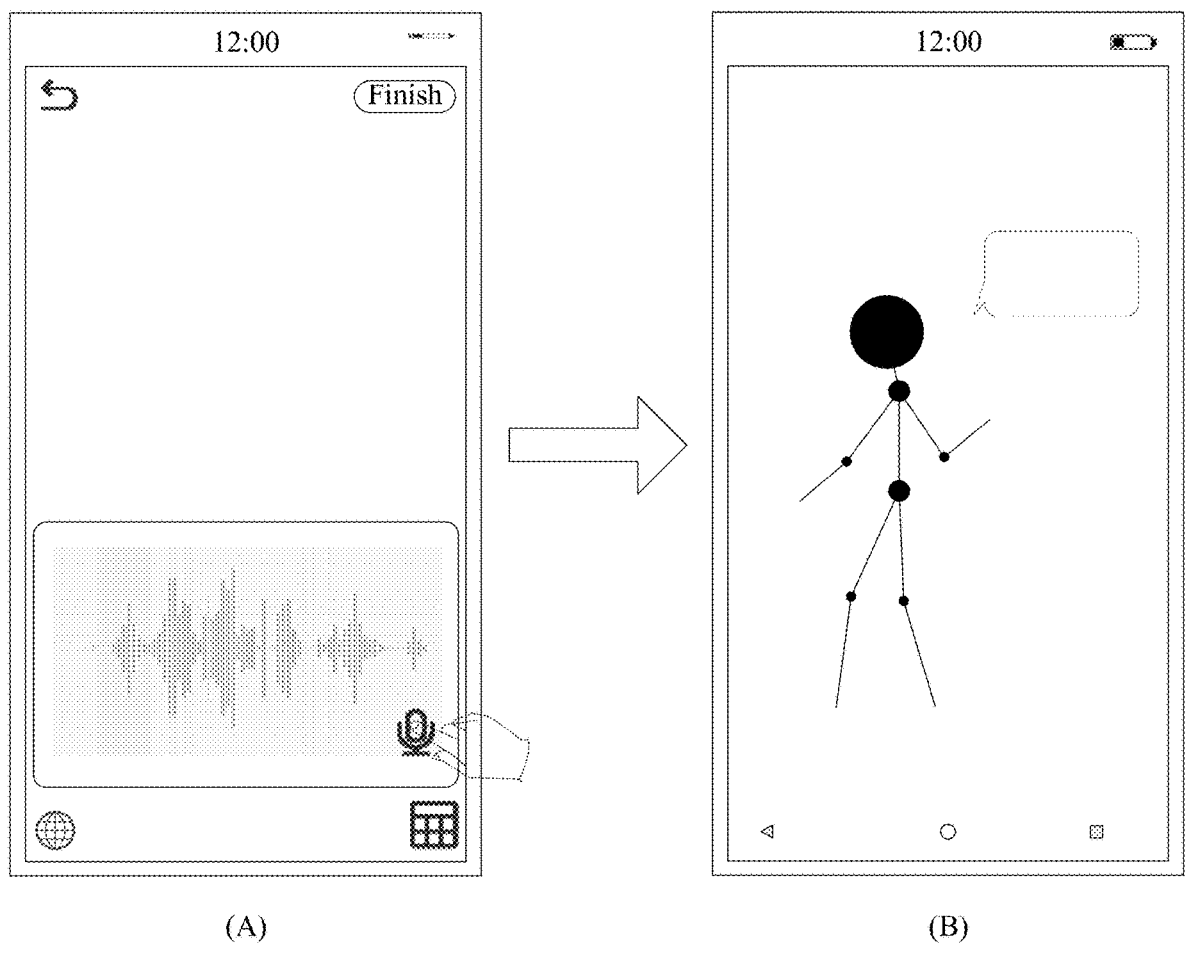
FIG. 1 is a schematic diagram of a scenario in which a video is generated based on a sound-picture matching method according to embodiment(s) of the present disclosure.

For ease of understanding, an implementation scenario to which the sound-picture matching method provided by the present disclosure is applicable is introduced below with reference to FIG. 1 by using a scenario of realizing a virtual broadcast object as an example. Referring to FIG. 1, which is a schematic diagram of a scenario in which a video is generated based on a sound-picture matching method according to an embodiment of the present disclosure. As shown in FIG. 1, FIG. 1(A) shows a method of inputting a voice sequence by a user through a microphone of a terminal device. The terminal device may acquire a to-be-matched voice segment from the voice sequence inputted by the user, determine a to-be-matched active segment online, and then synthesize the to-be-matched voice segment and the to-be-matched active segment to obtain a video segment, thereby obtaining the video segment as shown in FIG. 1(B). The video segment includes generated action pictures of an object and voices of the object. In this way, the synthesized video segment is more in line with the natural law of a character during speaking, so that the video segment displayed on the client of the terminal device may have better authenticity. The implementation scenarios are not exhaustive here.

In certain embodiments, the term "to-be-matched voice segment" is interchangeable with the term "voice segment."

In certain embodiments, the term "to-be-matched active segment" is interchangeable with the term "active segment."

Figure 2:
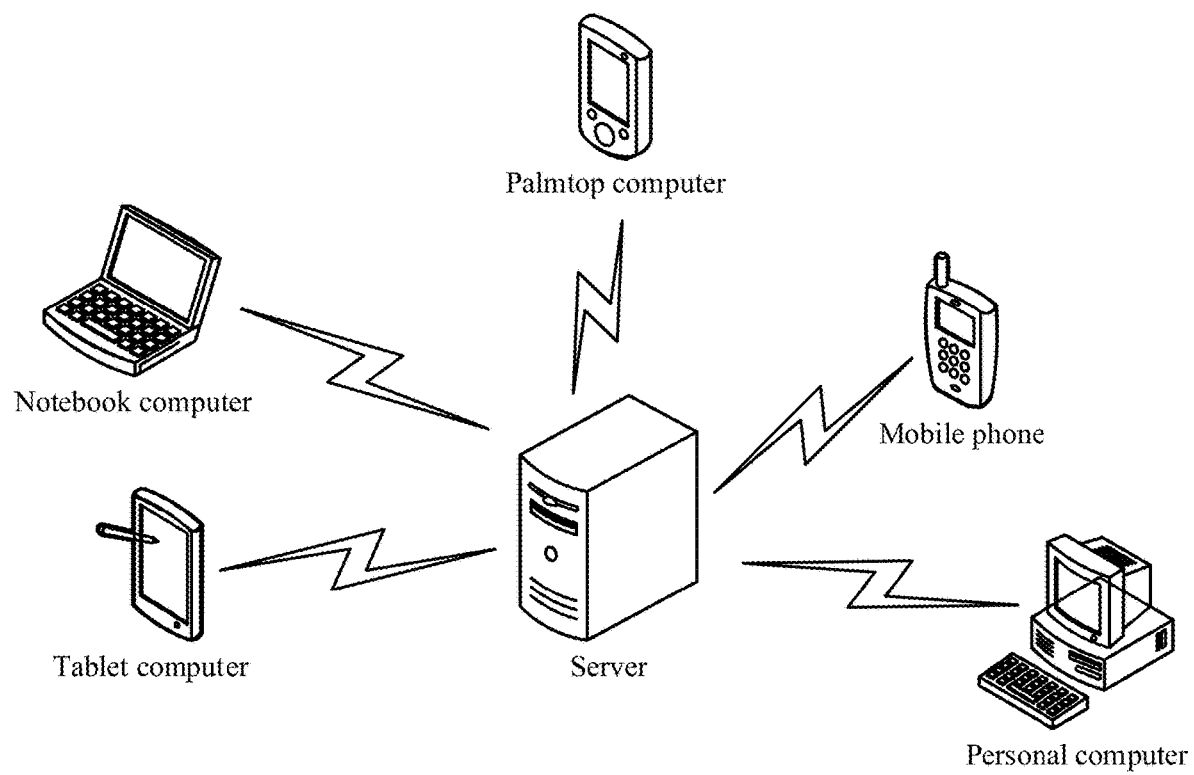
FIG. 2 is a schematic architectural diagram of a sound-picture matching system according to embodiment(s) of the present disclosure.

In order to improve the authenticity of video contents in various implementation scenarios, the present disclosure proposes a sound-picture matching method of a video, which is applied to a sound-picture matching system of a video shown in FIG. 2. Referring to FIG. 2, which is a schematic architectural diagram of a sound-picture matching system according to an embodiment of the present disclosure. As shown in FIG. 2, the sound-picture matching system of a video includes a server and a terminal device, and a sound-picture matching apparatus may be deployed in the server or in the terminal device. In an exemplary method, the terminal device acquires a voice sequence, acquires a to-be-matched voice segment from the voice sequence, acquires a to-be-matched active segment from an image sequence according to the sound-picture matching method provided in the present disclosure, and synthesizes the to-be-matched voice segment and the to-be-matched active segment at the terminal device side to obtain a video segment, which may be played back directly by the terminal device. In another exemplary method, the terminal device acquires a voice sequence and transmits the voice sequence to the server. The server acquires a to-be-matched voice segment from the voice sequence, then acquires a to-be-matched active segment from an image sequence according to the sound-picture matching method provided in the present disclosure, and synthesizes the to-be-matched voice segment and the to-be-matched active segment at the server side to obtain a video segment. The server feeds back the video segment to the terminal device for playback by the terminal device.

The server in FIG. 2 may be a server, a server cluster including a plurality of servers, or a cloud computing center, which is not limited herein. In addition to a tablet computer, a notebook computer, a palmtop computer, a mobile phone, and a personal computer (PC) shown in FIG. 2, the terminal device may also be another voice interactive device. The voice interactive device includes but is not limited to an intelligent audio system and an intelligent appliance.

Although FIG. 2 only shows five terminal devices and one server, it is to be understood that, the example in FIG. 2 is only used for understanding this solution, and a specific quantity of the terminal devices and the servers is to be determined with reference to actual situations flexibly.

The embodiments of the present disclosure may implement sound-picture matching based on Artificial Intelligence (AI) technologies.

Figure 3:
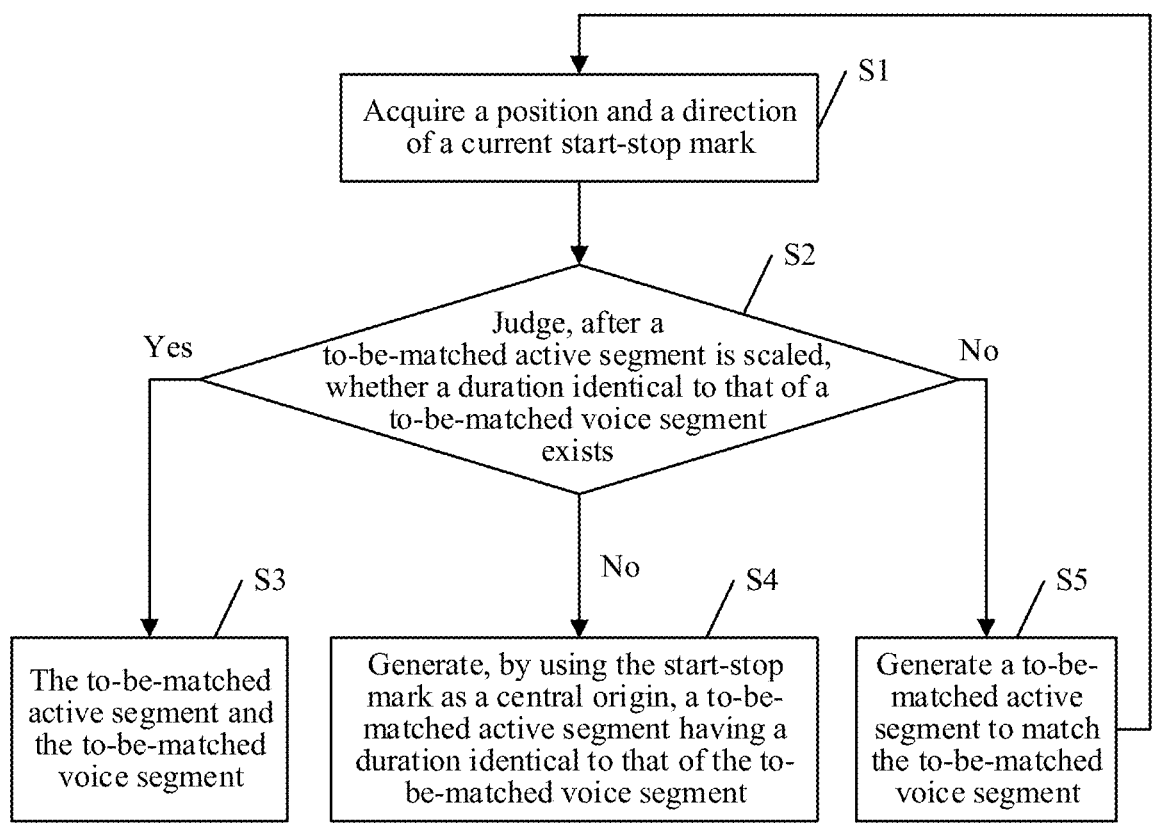
FIG. 3 is a schematic flowchart of a sound-picture matching method of a video according to embodiment(s) of the present disclosure.

Based on this, a sound-picture matching method of a video will be introduced below. Referring to FIG. 3, which is a schematic flowchart of a sound-picture matching method of a video according to an embodiment of the present disclosure. As shown in FIG. 3, the method includes the following steps:

Step S1: Acquire an initial position of a start-stop mark and a moving direction of the start-stop mark from an image sequence.

Step S2: Judge whether a to-be-matched active segment after scaling has a duration identical to that of a to-be-matched voice segment. When or in response to determining that they have an identical duration, step S3 is performed. When or in response to determining that they do not have an identical duration, and a reason is that the to-be-matched voice segment is too short, step S4 is performed. When or in response to determining that they do not have an identical duration, and a reason is that the to-be-matched active segment is too long, step S5 is performed.

Step S3: Match the scaled to-be-matched active segment directly with the to-be-matched voice segment to obtain a video segment.

Step S4: Generate the to-be-matched active segment by using the start-stop mark as a central origin, and match the to-be-matched active segment with the to-be-matched voice segment to obtain a video segment.

Step S5: Generate a to-be-matched active segment to match the to-be-matched voice segment, and then acquire an initial position and a moving direction of the start-stop mark again.

Figure 4:
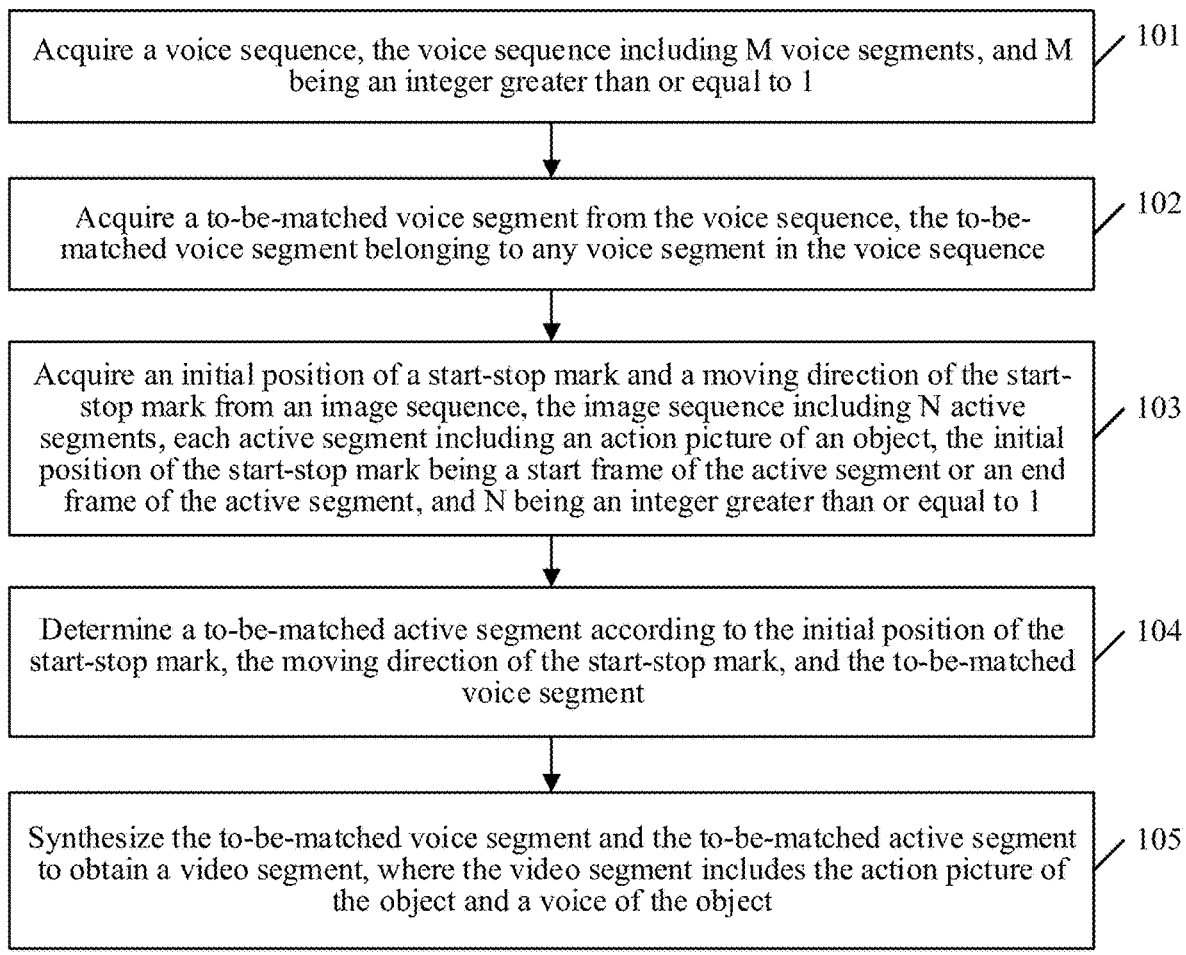
FIG. 4 is a schematic diagram of an embodiment of a sound-picture matching method of a video according to embodiment(s) of the present disclosure.

The solutions provided by the embodiments of the present disclosure relate to computer vision technologies. In combination with the above introduction, the sound-picture matching method of a video in the present disclosure will be introduced below by using a sound-picture matching apparatus in a computing device as an executive subject. Referring to FIG. 4, as shown in FIG. 4, an embodiment of the sound-picture matching method of a video according to an embodiment of the present disclosure includes the following steps:

Step 101: Acquire a voice sequence, the voice sequence including M voice segments, and M being an integer greater than or equal to 1.

In this embodiment, the sound-picture matching apparatus may receive a voice sequence transmitted by a client, and the voice sequence includes at least one voice segment. In certain embodiment(s), the voice sequence transmitted by the client is inputted online by a client user. For example, the user inputs a piece of voice through a microphone to generate a corresponding voice sequence, or the user enters a text content and converts the text content to obtain a voice sequence. In addition, the sound-picture matching apparatus may also acquire a voice sequence from a database, and the voice sequence includes at least one voice segment. The present disclosure does not make any limitation on the acquisition method of the voice sequence.

The sound-picture matching apparatus may be deployed in any computing device, such as a server or a terminal device. In the present disclosure, the sound-picture matching apparatus deployed in a terminal device is used as an example for description, but this is not to be construed as a limitation of the present disclosure.

Step 102: Acquire a to-be-matched voice segment from the voice sequence, the to-be-matched voice segment belonging to any voice segment in the voice sequence.

In this embodiment, the sound-picture matching apparatus may acquire a to-be-matched voice segment from the voice sequence. In certain embodiment(s), a duration of the to-be-matched voice segment is $l_i$, and i is an integer greater than or equal to 1 and less than or equal to M. In order to match and align the to-be-matched voice segment with the to-be-matched active segment in the image sequence, the present disclosure may extract segments from the voice sequence and the image sequence at a rate of 30 frames per second.

Figure 5:
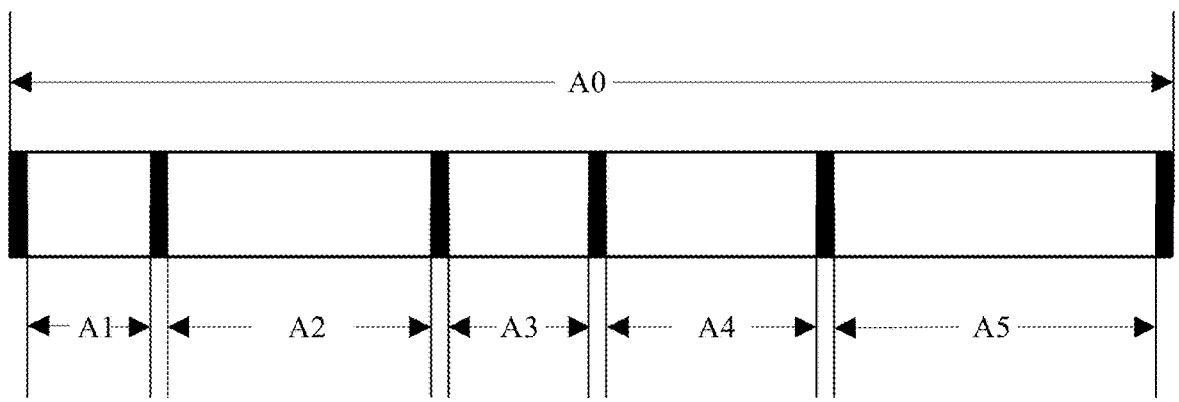
FIG. 5 is a schematic diagram of an embodiment of a voice sequence according to embodiment(s) of the present disclosure.

For ease of understanding, referring to FIG. 5, which is a schematic diagram of an embodiment of a voice sequence according to an embodiment of the present disclosure. As shown in FIG. 5, A0 is used for indicating a segment of voice sequence, where A1, A2, A3, A4, and A5 respectively indicate different voice segments in the voice sequence, and the to-be-matched voice segment may be any one of the five voice segments.

Step 103: Acquire an initial position of a start-stop mark and a moving direction of the start-stop mark from an image sequence, the image sequence including N active segments, each active segment including an action picture of an object, the initial position of the start-stop mark being a start frame of the active segment or an end frame of the active segment, and N being an integer greater than or equal to 1.

In this embodiment, the sound-picture matching apparatus may acquire an image sequence. The image sequence is a sequence composed of multiple frames of images, the image sequence includes active segments and silent segments, each active segment includes an action picture of an object, and each silent segment generally does not include the action picture of the object. For example, the silent segment may only include a background image.

The sound-picture matching apparatus acquires the initial position of the start-stop mark and the moving direction of the start-stop mark from the image sequence, and the initial position of the start-stop mark may be the start frame of the active segment or the end frame of the active segment. The start-stop mark may be a cursor or slide bar. The cursor has the ability of moving forward or backward, and therefore, the cursor may be used as a pointer, and the cursor may specify any position in the image sequence or the voice sequence. In certain embodiment(s), the slide bar has an ability of moving forward or backward, and may specify any position in the image sequence or the voice sequence. Therefore, the start-stop mark may be expressed as a frame number of one frame in the image sequence, and a total length of time is expressed as a quantity of frames. The object in the active segment may refer to a virtual object, such as a virtual announcer, a virtual character, a cartoon character, or the like, and the object may also refer to a real object, such as a user A.

Figure 6A:
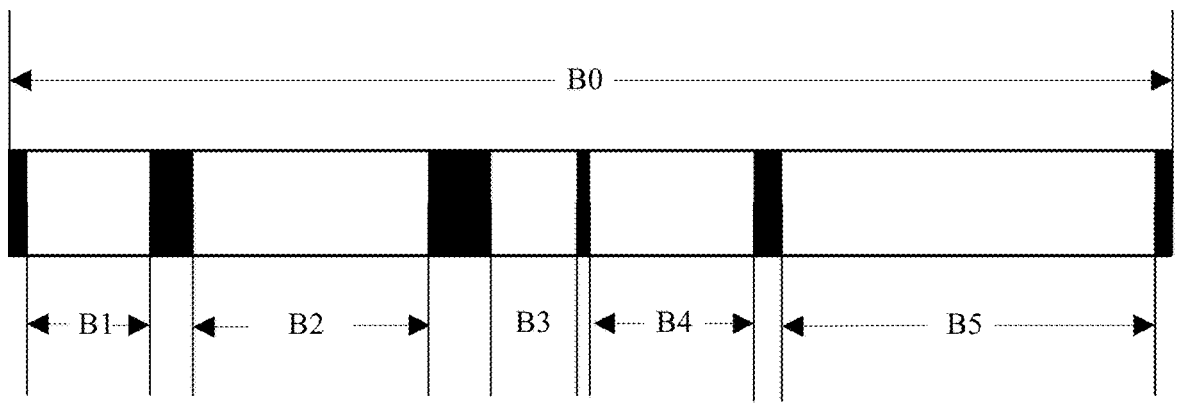
FIG. 6A is a schematic diagram of an embodiment of an image sequence according to embodiment(s) of the present disclosure.
Figure 6B:
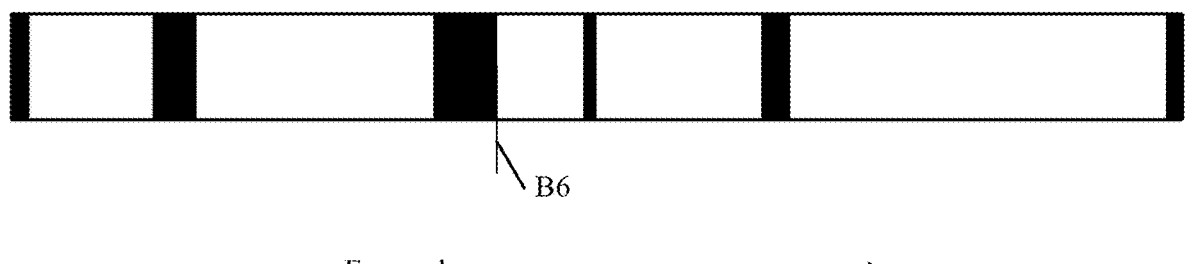
FIG. 6B is a schematic diagram of an embodiment of an initial position of a start-stop mark according to embodiment(s) of the present disclosure.
Figure 6C:
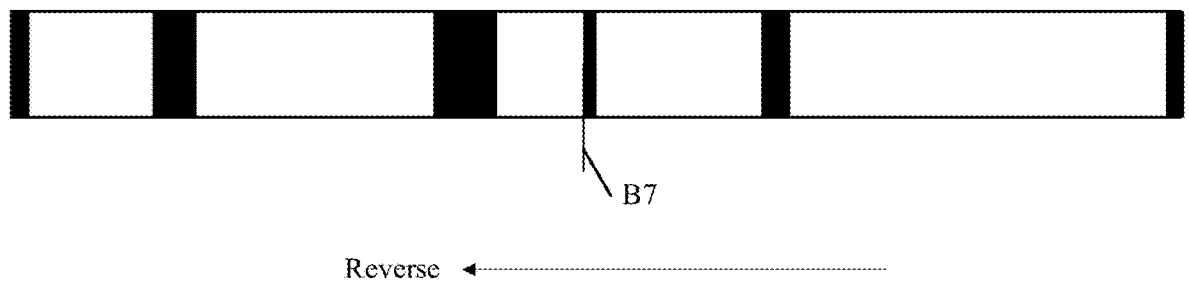
FIG. 6C is a schematic diagram of another embodiment of an initial position of a start-stop mark according to embodiment(s) of the present disclosure.

In certain embodiment(s), referring to FIG. 6A, which is a schematic diagram of an embodiment of an image sequence according to an embodiment of the present disclosure. As shown in FIG. 6A, B0 is used for indicating a segment of an image sequence, where B1, B2, B3, B4, and B5 respectively indicate different active segments in the image sequence. Referring to FIG. 6B, which is a schematic diagram of an embodiment of an initial position of a start-stop mark according to an embodiment of the present disclosure. As shown in FIG. 6B, when or in response to determining that the moving direction of the start-stop mark is a forward direction, B6 is used for indicating an initial position corresponding to the start-stop mark, and the initial position of the start-stop mark is a start frame of an active segment B3. Referring to FIG. 6C, which is a schematic diagram of another embodiment of an initial position of a start-stop mark according to an embodiment of the present disclosure. As shown in FIG. 6C, when or in response to determining that the moving direction of the start-stop mark is a reverse direction, B7 is used for indicating an initial position corresponding to the start-stop mark, and the initial position of the start-stop mark is an end frame of the active segment B3.

Step 104: Determine a to-be-matched active segment according to the initial position of the start-stop mark, the moving direction of the start-stop mark, and the to-be-matched voice segment.

In this embodiment, the sound-picture matching apparatus may determine the to-be-matched active segment according to the initial position of the start-stop mark, the moving direction of the start-stop mark, and the to-be-matched voice segment, and the to-be-matched active segment includes an action picture of the object. In certain embodiment(s), assuming that A3 in FIG. 5 is the to-be-matched voice segment, the moving direction of the start-stop mark is the forward direction, and the initial position of the start-stop mark is the position shown in B6 in FIG. 6B. Based on this, it may be determined that the to-be-matched active segment is the active segment B3 in FIG. 6A, and the to-be-matched active segment B3 includes an action picture of the object.

Step 105: Synthesize the to-be-matched voice segment and the to-be-matched active segment to obtain a video segment, where the video segment includes the action picture of the object and a voice of the object.

In this embodiment, the sound-picture matching apparatus synthesize the to-be-matched voice segment and the to-be-matched active segment to obtain the video segment. In certain embodiment(s), assuming that A3 in FIG. 5 is the to-be-matched voice segment, and B3 in FIG. 6A is the to-be-matched active segment, then the to-be-matched voice segment A3 and the to-be-matched active segment B3 may be synthesized to obtain a video segment. The to-be-matched voice segment A3 includes the voice of the object, and the to-be-matched active segment B3 includes the action picture of the object; therefore, the video segment includes both the action picture of the object and the corresponding voice.

In certain embodiment(s), in order to further improve the quality of the synthesized video, a neural network may also be used to synthesize corresponding lip shapes according to a speaking content, and then stitch the lip shapes to the synthesized video segment.

In certain embodiment(s), the video segment includes, but is not limited to, a virtual video segment, a synthesized video segment, and an edited video segment. When or in response to determining that the video segment is a virtual video segment, the virtual video segment includes an action picture of a virtual object and a voice of the virtual object. When or in response to determining that the video segment is a synthesized video segment, the synthesized video segment includes an action picture of an object and a voice of the object. When or in response to determining that the video segment is an edited video segment, the edited video segment includes a partial segment obtained by editing a video, and the segment includes an action picture of an object and a voice of the object.

A sound-picture matching method of a video is provided in the embodiments of the present disclosure. By using the above method, positions of start-stop marks may be used for locating positions of active segments in an image sequence in a video synthesizing process, so as to match the active segments having actions with voice segments. In this way, it can be ensured that the synthesized video segments have a more realistic visual effect, that is, a scenario of a character speaking in the video segments is more realistic and is close to the effect of the character speaking in a real scenario, which is difficult for people to recognize that the voices and images in the video segments are synthesized. In addition, moving directions of the start-stop marks can be used for matching the voice segments and the active segments in an orderly manner, which can improve the consistency and continuity of voices and images in the synthesized video segments.

In certain embodiment(s), based on the embodiment corresponding to FIG. 4, in an optional embodiment of the sound-picture matching method of a video provided by the embodiments of the present disclosure, when or in response to determining that the moving direction of the start-stop mark is a forward direction, and the initial position of the start-stop mark is less than or equal to a start frame of a $j^{th}$ (j is an integer greater than or equal to 1 and less than or equal to (N+1)) active segment, determining the to-be-matched active segment according to the initial position of the start-stop mark, the moving direction of the start-stop mark, and the to-be-matched voice segment may include: determining a minimum value of a first forward duration according to a minimum scaling, the initial position of the start-stop mark, and an end frame of the $i^{th}$ active segment; determining a maximum value of the first forward duration according to a maximum scaling, the initial position of the start-stop mark, and a start frame of a $(j+1)^{th}$ active segment; determining a target forward duration interval according to the minimum value of the first forward duration and the maximum value of the first forward duration; and determining, when or in response to determining that the to-be-matched voice segment is within the target forward duration interval, the to-be-matched active segment according to at least one of the $j^{th}$ active segment and the $(j+1)^{th}$ active segment.

The sound-picture matching method of a video further includes: updating the initial position of the start-stop mark when or in response to determining that a condition for updating the position of the start-stop mark is met; and adjusting the moving direction of the start-stop mark to be a reverse direction when or in response to determining that the updated initial position of the start-stop mark is greater than or equal to a position corresponding to an end frame of an $N^{th}$ active segment.

In this embodiment, when or in response to determining that the moving direction of the start-stop mark is the forward direction, and the initial position of the start-stop mark is less than or equal to the start frame of the $i^{th}$ active segment, the sound-picture matching apparatus may determine the minimum value of the first forward duration and the maximum value of the first forward duration, then determine the target forward duration interval. When or in response to determining that the to-be-matched voice segment is within the target forward duration interval, the to-be-matched active segment may be determined.

In certain embodiment(s), illustration is made by using the minimum scaling of 0.8 and the maximum scaling of 1.25 as examples. The minimum value of the first forward duration may be calculated by the following formula:

$$scale_{short}*(e_j-\text{Index}+1).$$

The maximum value of the first forward duration may be calculated by the following formula:

$$scale_{long}*(s_{j+1}-\text{Index}+1).$$

The target forward duration interval may be calculated by the following formula:

$$[scale_{short}*(e_j-\text{Index}+1), scale_{long}*(s_{j+1}-\text{Index}+1)],$$

where Index indicates the initial position of the start-stop mark, $scale_{short}$ indicates the minimum scaling, $e_j$ indicates the end frame of the $j^{th}$ active segment, $scale_{long}$ indicates the maximum scaling, and $s_{j+1}$ indicates the start frame of the $(j+1)^{th}$ active segment.

Figure 7:
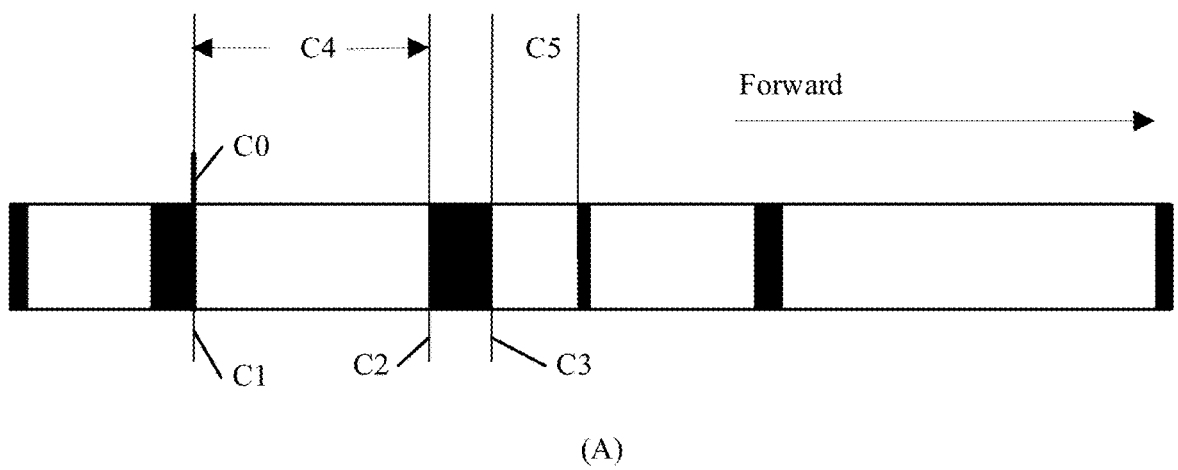
FIG. 7 is a schematic diagram of an embodiment of determining a to-be-matched active segment according to embodiment(s) of the present disclosure.
Figure 7:
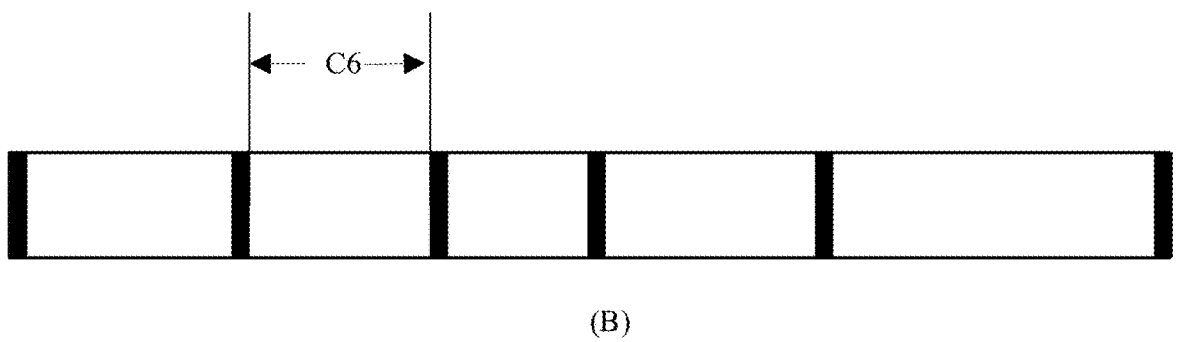

For ease of understanding, when or in response to determining that the moving direction of the start-stop mark is the forward direction, illustration is made by taking that the initial position of the start-stop mark is the 10th frame of the image sequence, the start frame of the $j^{th}$ active segment is the 10th frame, the end frame of the $j^{th}$ active segment is the 16th frame, and the start frame of the $(j+1)^{th}$ active segment is the 18th frame as an example. Referring to FIG. 7, which is a schematic diagram of an embodiment of determining a to-be-matched active segment according to an embodiment of the present disclosure. As shown in FIG. 7, C0 shown in FIG. 7(A) indicates the initial position Index of the start-stop mark, that is, the 10th frame of the image sequence. C1 indicates the start frame $s_j$ of the $j^{th}$ active segment, that is, the 10th frame of the image sequence. C2 indicates the end frame $e_j$ of the $j^{th}$ active segment, that is, the 16th frame of the image sequence. C3 indicates the start frame $s_{j+1}$ of the $(j+1)^{th}$ active segment, that is, the 18th frame of the image sequence. C4 indicates the length of the $j^{th}$ active segment, and C5 indicates the length of the $(j+1)^{th}$ active segment.

As can be obtained from the formulas, the minimum value of the first forward duration is 5.6, and the maximum value of the first forward duration is 11.25, so that it may be obtained that the target forward duration interval is [5.6, 11.25]. When or in response to determining that a duration of the to-be-matched voice segment is within [5.6, 11.25], that is, the to-be-matched voice segment C6 as shown in FIG. 7(B), a to-be-matched active segment may be determined according to at least one of the active segment C4 and the active segment C5.

When or in response to determining that the condition for updating the position of the start-stop mark is met, the sound-picture matching apparatus may further update the initial position of the start-stop mark. When or in response to determining that the updated initial position of the start-stop mark is greater than or equal to a position corresponding to the end frame of the $N^{th}$ active segment, the moving direction of the start-stop mark is adjusted to a reverse direction. In other words, when or in response to determining that the moving direction of the start-stop mark is a forward direction, and the updated initial position of the start-stop mark has exceeded an end frame of the last active segment in the image sequence, the moving direction of the start-stop mark may be changed to the reverse direction to perform an operation. By updating and adjusting the moving direction of the start-stop mark from the forward direction to the reverse direction, the real-time inputted voice sequence can be matched, thereby generating a video with high authenticity in real time.

In the embodiments of the present disclosure, a method for determining a to-be-matched active segment is provided. Through the above method, when or in response to determining that the moving direction of the start-stop mark is the forward direction, the to-be-matched active segment is determined according to the initial position of the start-stop mark, the start frame and end frame of the active segment, and the to-be-matched voice segment, so that the synthesized video is more in line with a scenario of the actual voice description of the object, and therefore, the video is more realistic. In addition, by matching the active segment with the next active segment, to-be-matched active segments corresponding to different to-be-matched voice segments are connected end to end, thereby improving the consistency and continuity of voices and images in the synthesized video segments.

In certain embodiment(s), based on the embodiment corresponding to FIG. 4, in another optional embodiment of the sound-picture matching method of a video provided by the embodiments of the present disclosure, determining the to-be-matched active segment according to at least one of the $j^{th}$ active segment and the $(j+1)^{th}$ active segment may include: determining a minimum value of a second forward duration according to the initial position of start-stop mark and the end frame of the $j^{th}$ active segment, where the minimum value of the second forward duration is greater than the minimum value of the first forward duration; determining a first forward duration interval according to the minimum value of the first forward duration and the minimum value of the second forward duration; and scaling, when or in response to determining that the to-be-matched voice segment is within the first forward duration interval, a duration between the initial position of start-stop mark and the end frame of the $j^{th}$ active segment according to a duration of the to-be-matched voice segment to obtain the to-be-matched active segment.

The updating the initial position of the start-stop mark when or in response to determining that a condition for updating the position of the start-stop mark is met may include: meeting the condition for updating the position of the start-stop mark when or in response to determining that the to-be-matched voice segment is within the first forward duration interval; and updating the initial position of the start-stop mark to a position corresponding to the end frame of the $j^{th}$ active segment.

In this embodiment, the sound-picture matching apparatus may determine the minimum value of the second forward duration, and then determine the first forward duration interval according to the minimum value of the first forward duration and the minimum value of the second forward duration. When or in response to determining that the to-be-matched voice segment is within the first forward duration interval, the duration between the initial position of the start-stop mark and the end frame of the jth active segment is scaled according to the duration of the to-be-matched voice segment to obtain the to-be-matched active segment. When or in response to determining that the to-be-matched voice segment is within the first forward duration interval, it indicates that the condition for updating the position of the start-stop mark is met, and the initial position of the start-stop mark may be updated to the position corresponding to the end frame of the jth active segment.

In certain embodiment(s), the minimum value of the second forward duration may be calculated by the following formula:

$$e_j - \text{Index} + 1.$$

Moreover, the first forward duration interval may be calculated by the following formula:

$$[\text{scale}_{short} * (e_j - \text{Index} + 1), e_j - \text{Index} + 1],$$

where Index indicates the initial position of the start-stop mark, scaleshort indicates the minimum scaling, and ej indicates the end frame of the jth active segment.

Figure 8:
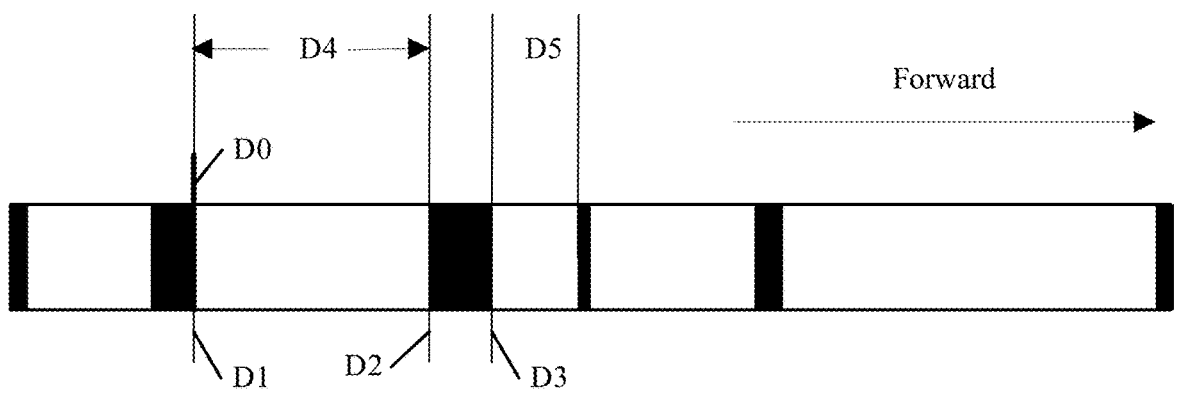
FIG. 8 is a schematic diagram of another embodiment of determining a to-be-matched active segment according to embodiment(s) of the present disclosure.
Figure 8:
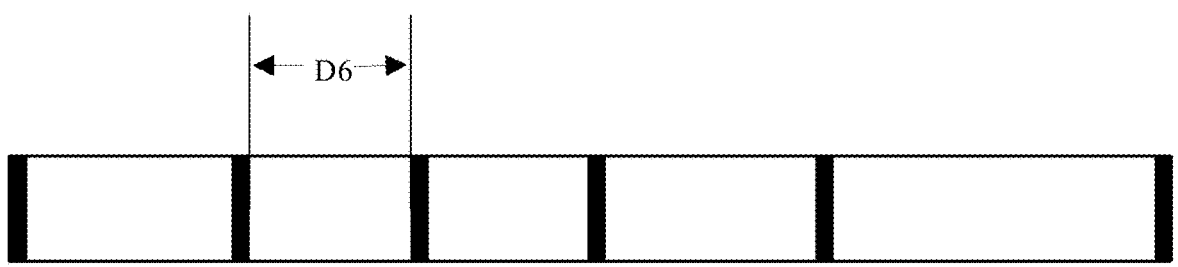

For ease of understanding, illustration is made by taking that the initial position of the start-stop mark is the 10th frame, the start frame of the jth active segment is the 10th frame, the end frame of the jth active segment is the 16th frame, the start frame of the (j+1)th active segment is the 18th frame, and the duration of the to-be-matched voice segment is 6 frames as an example. Referring to FIG. 8, which is a schematic diagram of another embodiment of determining a to-be-matched active segment according to an embodiment of the present disclosure. As shown in FIG. 8, D0 shown in FIG. 8(A) indicates the initial position Index of the start-stop mark, and is the 10th frame. D1 indicates the start frame sj of the jth active segment, and is the 10th frame of the image sequence. D2 indicates the end frame ej of the jth active segment, and is the 16th frame of the image sequence. D3 indicates the start frame sj+1 of the (j+1)th active segment, and is the 18th frame of the image sequence. D4 indicates the length of the jth active segment, and D5 indicates the length of the (j+1)th active segment.

As can be obtained from the formulas, the minimum value of the first forward duration is 5.6 frames, and the minimum value of the second forward duration is 7 frames, so that it may be obtained that the first forward duration interval is [5.6, 7]. Assuming that the to-be-matched voice segment D6 shown in FIG. 8(B) is 6 frames, that is, the duration of the to-be-matched voice segment is within the first forward duration interval, and therefore, the duration between the initial position of the start-stop mark and the end frame of the jth active segment may be scaled according to the duration of the to-be-matched voice segment D6. For example, the duration of the jth active segment is scaled to 6 frames, thereby matching the to-be-matched voice segment D6.

When or in response to determining that the duration of the to-be-matched voice segment is within the first forward duration interval, the condition for updating the position of the start-stop mark is met, and therefore, the initial position of the start-stop mark may be updated to the position corresponding to the end frame of the jth active segment, that is, the initial position of the start-stop mark is changed from the 10th frame to the 16th frame.

In certain embodiment(s), based on the embodiment corresponding to FIG. 4, in another optional embodiment of the sound-picture matching method of a video provided by the embodiments of the present disclosure, determining the to-be-matched active segment according to at least one of the jth active segment and the (j+1)th active segment may include: determining a maximum value of the second forward duration according to the initial position of the start-stop mark and an end frame of the (j+1)th active segment, where the maximum value of the second forward duration is less than the maximum value of the first forward duration; determining a second forward duration interval according to the maximum value of the first forward duration and the maximum value of the second forward duration; scaling, when or in response to determining that the to-be-matched voice segment is within the second forward duration interval, a duration between the initial position of the start-stop mark and a start frame of the (j+1)th active segment according to a duration of the to-be-matched voice segment to obtain the to-be-matched active segment.

The updating the initial position of the start-stop mark when or in response to determining that a condition for updating the position of the start-stop mark is met may include: meeting the condition for updating the position of the start-stop mark when or in response to determining that the to-be-matched voice segment is within the second forward duration interval; and updating the initial position of the start-stop mark to a position corresponding to the start frame of the (j+1)th active segment.

In this embodiment, the sound-picture matching apparatus may determine the maximum value of the second forward duration, and then determine the second forward duration interval according to the maximum value of the first forward duration and the maximum value of the second forward duration. When or in response to determining that the to-be-matched voice segment is within the second forward duration interval, the duration between the initial position of the start-stop mark and the start frame of the (j+1)th active segment is scaled according to the duration of the to-be-matched voice segment to obtain the to-be-matched active segment. When or in response to determining that the to-be-matched voice segment is within the second forward duration interval, the initial position of the start-stop mark may be updated to the position corresponding to the start frame of the (j+1)th active segment.

In certain embodiment(s), the maximum value of the second forward duration may be calculated by the following formula:

$$s_{j+1} - \text{Index} + 1.$$

Moreover, the second forward duration interval may be calculated by the following formula:

$$[s_{j+1} - \text{Index} + 1, \text{scale}_{long} * (s_{j+1} - \text{Index} + 1)],$$

where Index indicates the initial position of the start-stop mark, scalelong indicates the maximum scaling, and sj+1 indicates the start frame of the (j+1)th active segment.

Figure 9:
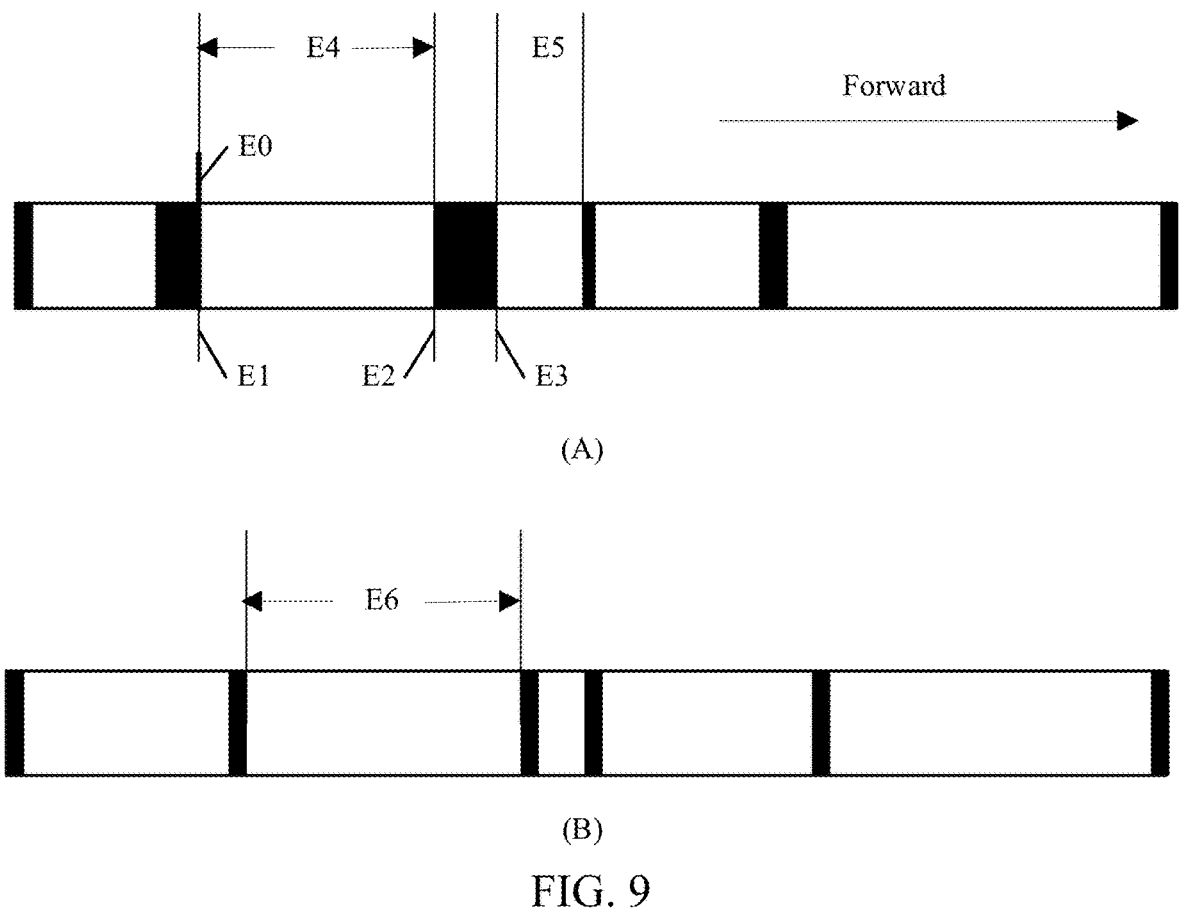
FIG. 9 is a schematic diagram of another embodiment of determining a to-be-matched active segment according to embodiment(s) of the present disclosure.

For ease of understanding, illustration is made by taking that the initial position of the start-stop mark is the 10th frame, the start frame of the jth active segment is the 10th frame, the end frame of the j-th active segment is the 16th frame, the start frame of the (j+1)th active segment is the 18th frame, and the duration of the to-be-matched voice segment is 10 frames as an example. Referring to FIG. 9, which is a schematic diagram of another embodiment of determining a to-be-matched active segment according to an embodiment of the present disclosure. As shown in FIG. 9, E0 shown in FIG. 9(A) indicates the initial position Index of the start-stop mark, and is the 10th frame. E1 indicates the start frame sj of the jth active segment, and is the 10th frame of the image sequence; E2 indicates the end frame ej of the jth active segment, and is the 16th frame of the image sequence; E3 indicates the start frame sj+1 of the (j+1)th active segment, and is the 18th frame of the image sequence; E4 indicates the length of the jth active segment; and E5 indicates the length of the (j+1)th active segment.

As can be obtained from the formulas, the maximum value of the first forward duration is 11.25 frames, and the maximum value of the second forward duration is 9 frames, so that it may be obtained that the second forward duration interval is [9, 11.25]. Assuming that the to-be-matched voice segment E6 shown in FIG. 9(B) is 10 frames, that is, the duration of the to-be-matched voice segment is within the second forward duration interval, and therefore, the duration between the initial position of the start-stop mark and the start frame of the (j+1)th active segment may be scaled according to the duration of the to-be-matched voice segment E6. For example, a duration between E0 and E3 is scaled to 10 frames. In this way, a to-be-matched active segment having a duration identical to that of the to-be-matched voice segment E6 may be obtained.

When or in response to determining that the duration of the to-be-matched voice segment is within the second forward duration interval, the condition for updating the position of the start-stop mark is met, and therefore, the initial position of the start-stop mark may be updated to the position corresponding to the start frame of the (j+1)th active segment, that is, the initial position of the start-stop mark is changed from the 10th frame to the 18th frame.

In certain embodiment(s), based on the embodiment corresponding to FIG. 4, in another optional embodiment of the sound-picture matching method of a video provided by the embodiments of the present disclosure, determining the to-be-matched active segment according to at least one of the jth active segment and the (j+1)th active segment may include: determining a minimum value of the second forward duration according to the initial position of start-stop mark and the end frame of the jth active segment, where the minimum value of the second forward duration is greater than the minimum value of the first forward duration; determining a maximum value of the second forward duration according to the initial position of the start-stop mark and an end frame of the (j+1)th active segment, where the maximum value of the second forward duration is less than the maximum value of the first forward duration; determining a third forward duration interval according to the minimum value of the second forward duration and the maximum value of the second forward duration; determining, when or in response to determining that the to-be-matched voice segment is within the third forward duration interval, the to-be-matched active segment according to the initial position of the start-stop mark and the duration of the to-be-matched voice segment.

The updating the initial position of the start-stop mark when or in response to determining that a condition for updating the position of the start-stop mark is met may include: meeting the condition for updating the position of the start-stop mark when or in response to determining that the to-be-matched voice segment is within the third forward duration interval; and updating the initial position of the start-stop mark to a position corresponding to an end frame of the to-be-matched active segment.

In this embodiment, the sound-picture matching apparatus determines the minimum value of the second forward duration and the maximum value of the second forward duration, and then determines the third forward duration interval according to the minimum value of the second forward duration and the maximum value of the second forward duration. When or in response to determining that the to-be-matched voice segment is within the third forward duration interval, the to-be-matched active segment is determined according to the initial position of the start-stop mark and the duration of the to-be-matched voice segment. When or in response to determining that the to-be-matched voice segment is within the third forward duration interval, the initial position of the start-stop mark is updated to the position corresponding to the end frame of the to-be-matched active segment.

In certain embodiment(s), the third forward duration interval may be calculated by the following formula:

$$[e_j - \text{Index} + 1, s_{j+1} - \text{Index} + 1],$$

where Index indicates the initial position of the start-stop mark, ej indicates the end frame of the jth active segment, and sj+1 indicates the start frame of the (j+1)th active segment.

Figure 10:
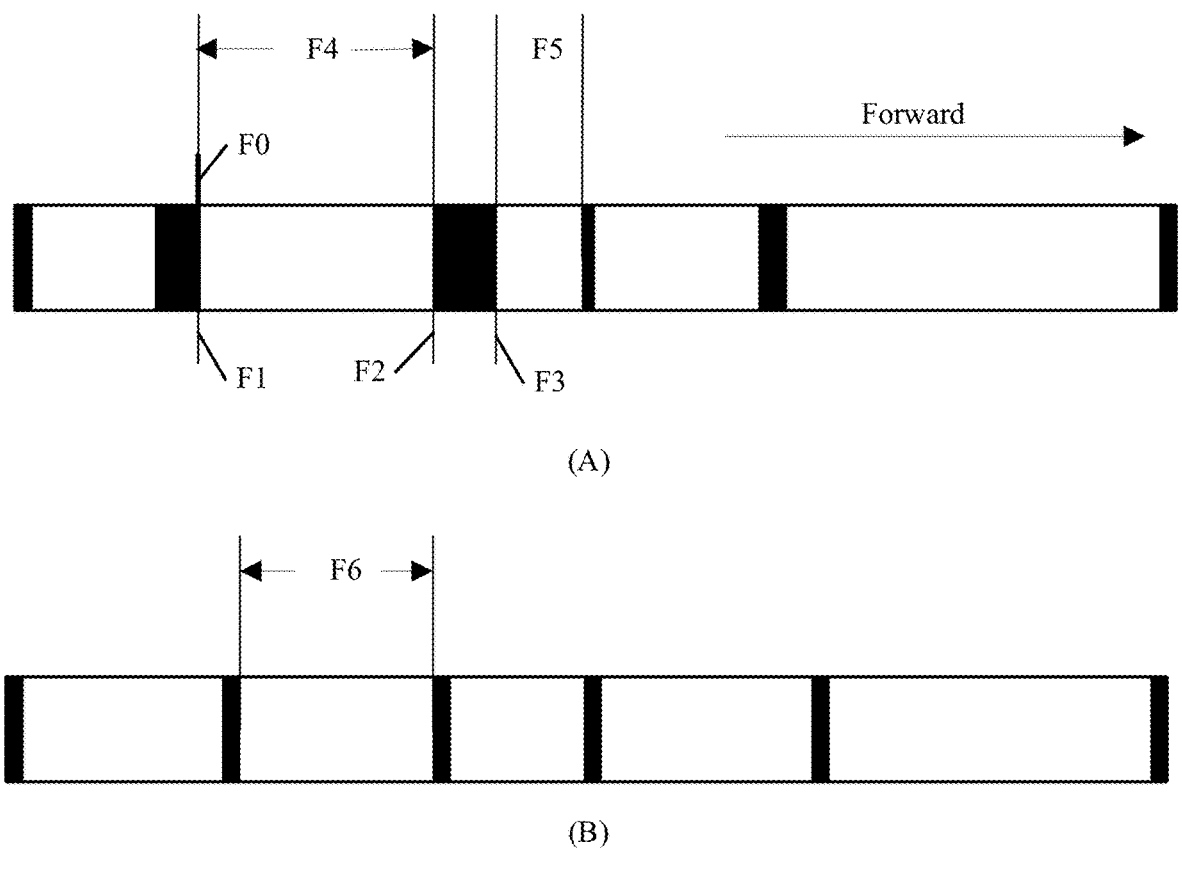
FIG. 10 is a schematic diagram of another embodiment of determining a to-be-matched active segment according to embodiment(s) of the present disclosure.

For ease of understanding, illustration is made by taking that the initial position of the start-stop mark is the 10th frame, the start frame of the jth active segment is the 10th frame, the end frame of the jth active segment is the 16th frame, the start frame of the (j+1)th active segment is the 18th frame, and the duration of the to-be-matched voice segment is 8 frames as an example. Referring to FIG. 10, which is a schematic diagram of another embodiment of acquiring a to-be-matched active segment according to an embodiment of the present disclosure. As shown in FIG. 10, F0 shown in FIG. 10(A) indicates the initial position Index of the start-stop mark, and is the 10th frame. F1 indicates the start frame sj of the jth active segment, and is the 10th frame of the image sequence; F2 indicates the end frame ej of the jth active segment, and is the 16th frame of the image sequence; F3 indicates the start frame sj+1 of the (j+1)th active segment, and is the 18th frame of the image sequence; F4 indicates the length of the jth active segment; and F5 indicates the length of the (j+1)th active segment.

As can be obtained from the formulas, the minimum value of the second forward duration is 7 frames, and the maximum value of the second forward duration is 9 frames, so that it may be obtained that the third forward duration interval is [7, 9]. Assuming that the to-be-matched voice segment F6 shown in FIG. 10(B) is 8 frames, that is, the duration of the to-be-matched voice segment is within the third forward duration interval, and therefore, the to-be-matched active segment may be determined according to the initial position F0 of the start-stop mark and the duration of the to-be-matched voice segment F6 by using the following method:

$$[Index, Index+l_i-1],$$

where Index indicates the initial position of the start-stop mark, and li indicates the length of the to-be-matched voice segment. Assuming that the length of the to-be-matched voice segment is 8 frames, that is, the to-be-matched active segment is indicated as an active segment between the 10th frame and the 17th frame.

When or in response to determining that the duration of the to-be-matched voice segment is within the third forward duration interval, the condition for updating the position of the start-stop mark is met, and therefore, the initial position of the start-stop mark may be updated to the position corresponding to the end frame of the to-be-matched active segment. That is, the initial position of the start-stop mark is changed from the 10th frame to the 17th frame, thereby ensuring that the initial position of the start-stop mark is located in a silent segment.

In the embodiments of the present disclosure, a method for determining a to-be-matched active segment is provided. Through the above method, different methods may be used to determine the to-be-matched active segment when or in response to determining that the length of the to-be-matched voice segment is different, thereby improving the diversity of a matching algorithm. Moreover, the updated start-stop mark falls within the silent segment, allowing the active segment to be voiced, so that the synthesized video appears more natural. Further, the matching method provided by the present disclosure is simple in calculation, may be used for real-time calculation, and can synthesize video segments online.

In certain embodiment(s), based on the embodiment corresponding to FIG. 4 above, in another optional embodiment of a sound-picture matching method of a video provided by the embodiments of the present disclosure, after determining the target forward duration interval according to the minimum value of the first forward duration and the maximum value of the first forward duration, the sound-picture matching method of a video further includes: determining, when or in response to determining that the to-be-matched voice segment is not within the target forward duration interval, and a duration of the to-be-matched voice segment is less than the minimum value of the first forward duration, the to-be-matched active segment according to the duration of the to-be-matched voice segment as well as the initial position and a moving radius of the start-stop mark; or, determining, when or in response to determining that the to-be-matched voice segment is not within the target forward duration interval, and a duration of the to-be-matched voice segment is less than the minimum value of the first forward duration, the to-be-matched active segment according to the duration of the to-be-matched voice segment and the initial position of the start-stop mark.

In this embodiment, when or in response to determining that the to-be-matched voice segment is not within the target forward duration interval, and the duration of the to-be-matched voice segment is less than the minimum value of the first forward duration, the sound-picture matching apparatus may determine the to-be-matched active segment by using a two-way swing value taking method, or the sound-picture matching apparatus may take several frames in the direction towards the silent segment to determine the to-be-matched active segment.

In certain embodiment(s), illustration is made by taking that the initial position of the start-stop mark is the 10th frame, the start frame of the jth active segment is the 10th frame, the end frame of the jth active segment is the 16th frame, the start frame of the (j+1)th active segment is the 18th frame, and the duration of the to-be-matched voice segment is 3 frames as an example. As can be obtained from the above formulas, the target forward duration interval is [5.6, 11.25]. Therefore, the to-be-matched voice segment is not within the target forward duration interval, and is less than the minimum value of the first forward duration, that is, 5.6. As a result, a to-be-matched active segment may be obtained by using the initial position of the start-stop mark as a center and moving back and forth in the active segment with a moving radius r.

In certain embodiment(s), the moving radius is usually an integer greater than or equal to 1 and less than or equal to 5, and the initial position of the start-stop mark is not updated. Assuming that the radius is 3 and the initial position of the start-stop mark is the 10th frame, then the 10th frame, the 11th frame, the 12th frame, the 11th frame, the 10th frame, the 9th frame, the 8th frame, the 9th frame, the 10th frame, the 11th frame, the 12th frame, the 11th frame, and the like may be obtained, and so on. Based on the duration of the to-be-matched voice segment, the corresponding frames are acquired in sequence. Assuming that the duration of the to-be-matched voice segment is 3 frames, that is, the first 3 frames of image, namely the 10th frame, the 11th frame, and the 12th frame, are taken from the above sequence.

In certain embodiment(s), there are two methods for designing an active segment. The first method is using the first frame of an action picture in the active segment as a start frame, and the last frame of the action picture in the active segment as an end frame. In other words, the active segment is consistent with a segment having an action as seen by naked eyes. Another method is selecting several frames of a silent picture before the first frame of the action picture, and using a certain frame corresponding to the silent picture as the start frame of the active segment. In certain embodiment(s), one frame is selected from several frames of the silent picture after the end of the last frame of the action picture and used as the end frame of the active segment. In this way, it is equivalent to that the active segment actually includes a small silent segment in both head and tail parts. Based on the above two methods, the present disclosure provides the following two solutions.

Figure 11:
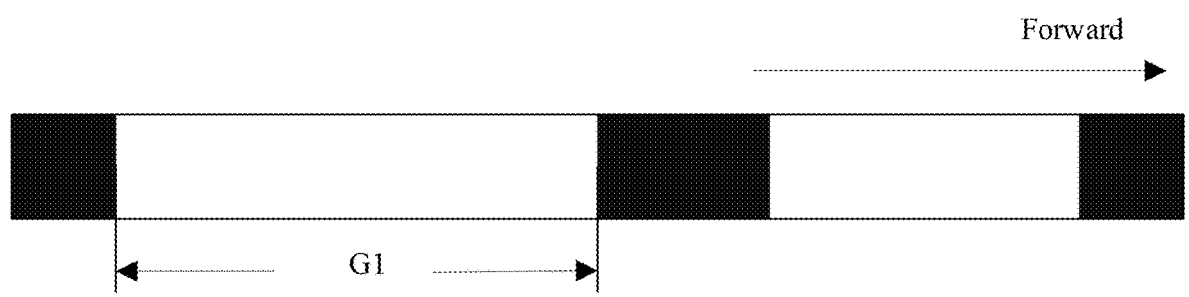
FIG. 11 is a schematic diagram of another embodiment of determining a to-be-matched active segment according to embodiment(s) of the present disclosure.
Figure 11:
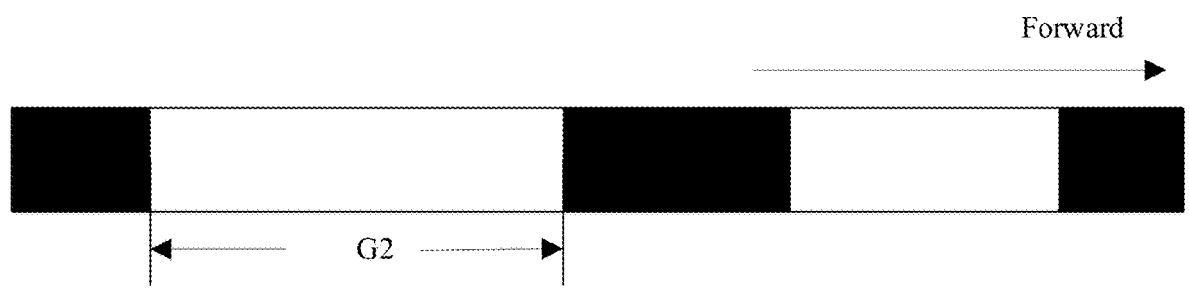

For ease of understanding, referring to FIG. 11, which is a schematic diagram of another embodiment of determining a to-be-matched active segment according to an embodiment of the present disclosure. As shown in FIG. 11, FIG. 11(A) shows an active segment G1 of which both head and tail parts include a small silent segment, that is, the active segment G1 may include image frames having actions and silent frames. The to-be-matched active segment is obtained by using the initial position of the start-stop mark as the center, and moving back and forth with a moving radius r. In certain embodiment(s), the to-be-matched active segment usually includes several silent frames, and may also include a small number of active frames. FIG. 11(B) shows an active segment G2 that does not include a silent frame, that is, the active segment G2 only includes image frames having actions. Therefore, the to-be-matched active segment may be taken directly by moving several frames from the initial position of the start-stop mark towards the direction of the silent segment, and the number of frames of the to-be-matched active segment is identical to that of the to-be-matched voice segment. That is, when or in response to determining that the start-stop mark is at the start frame of the active segment, a few frames are taken forward according to the duration of the to-be-matched voice segment, for example, 3 frames are taken from the 10th frame in a reverse direction (the direction of the silent segment), so as to acquire the to-be-matched active segment. When or in response to determining that the start-stop mark is at the end frame of the active segment, a few frames are taken backward according to the duration of the to-be-matched voice segment, for example, 3 frames are taken from the 16th frame in the forward direction (the direction of the silent segment), so as to acquire the to-be-matched active segment.

In the embodiments of the present disclosure, a method for determining a to-be-matched active segment is provided. Through the above method, when or in response to determining that the voice segment is too short, a silent segment may be matched, so that the synthesized video does not appear too obtrusive, thereby improving the authenticity of the video.

In certain embodiment(s), based on the embodiment corresponding to FIG. 4 above, in another optional embodiment of a sound-picture matching method of a video provided by the embodiments of the present disclosure, after determining the target forward duration interval according to the minimum value of the first forward duration and the maximum value of the first forward duration, the sound-picture matching method of a video further includes: acquiring, when or in response to determining that the to-be-matched voice segment is not within the target forward duration interval and the duration of the to-be-matched voice segment is greater than the maximum value of the first forward duration, a kth active segment from the image sequence, where k is an integer greater than or equal to 1 and less than or equal to N; determining a minimum value of a third forward duration according to the maximum scaling, the initial position of the start-stop mark, and a start frame of the kth active segment; determining a maximum value of the third forward duration according to the minimum scaling, the initial position of the start-stop mark, and an end frame of a (k+1)th active segment; determining a fourth forward duration interval according to the minimum value of the third forward duration and the maximum value of the third forward duration; determining, when or in response to determining that the to-be-matched voice segment is within the fourth forward duration interval, a duration of the to-be-matched active segment according to the initial position of the start-stop mark, the maximum scaling, and the start frame of the k-th active segment; and dividing, according to the duration of the to-be-matched active segment, the to-be-matched voice segment into a first voice segment and a second voice segment, where a duration of the first voice segment is consistent with the duration of the to-be-matched active segment, and the second voice segment is used for matching a corresponding action segment according to the updated initial position of the start-stop mark.

The updating the initial position of the start-stop mark when or in response to determining that a condition for updating the position of the start-stop mark is met may include: meeting the condition for updating the position of the start-stop mark when or in response to determining that the to-be-matched voice segment is within the fourth forward duration interval; and updating the initial position of the start-stop mark to a position corresponding to the start frame of the kth active segment.

In this embodiment, when or in response to determining that the to-be-matched voice segment is too long, the sound-picture matching apparatus may acquire the kth active segment from the image sequence, then determine the minimum value of the third forward duration and the maximum value of the third forward duration, thereby determining the fourth forward duration interval. When or in response to determining that the to-be-matched voice segment is within the fourth forward duration interval, the duration of the to-be-matched active segment is determined according to the initial position of the start-stop mark, the maximum scaling, and the start frame of the kth active segment, so that the to-be-matched voice segment is divided into the first voice segment and the second voice segment. The second voice segment is used for matching a corresponding action segment according to the updated initial position of the start-stop mark, that is, the second voice segment is used as a to-be-matched voice segment of the next round for performing sound-picture matching again. When or in response to determining that the to-be-matched voice segment is within the fourth forward duration interval, it indicates that the condition for updating the position of the start-stop mark is met, and then the initial position of the start-stop mark is updated to the position corresponding to the start frame of the kth active segment.

In certain embodiment(s), illustration is made by taking that the initial position of the start-stop mark is the 10th frame, the start frame of the jth active segment is the 10th frame, the end frame of the jth active segment is the 16th frame, the start frame of the (j+1)th active segment is the 18th frame, and the duration of the to-be-matched voice segment is 25 frames as an example. As can be obtained from the above formulas, the target forward duration interval is [5.6, 11.25]. The maximum value of the first forward duration is 11.25 frames, and the to-be-matched voice segment is not within the target forward duration interval and is greater than the maximum value of the first forward duration. Therefore, the kth active segment may be acquired.

The minimum value of the third forward duration may be calculated by the following formula:

$$scale_{long}*(s_k-\text{Index}+1).$$

The maximum value of the third forward duration may be calculated by the following formula:

$$scale_{short}*(e_{k+1}-\text{Index}+1).$$

The fourth forward duration interval may be calculated by the following formula:

$$[scale_{long}*(s_k-\text{Index}+1), scale_{short}*(e_{k+1}-\text{Index}+1)].$$

The duration of the to-be-matched active segment may be calculated by the following formula:

$$scale_{long}*(s_k-\text{Index}+1)-1,$$

where Index indicates the initial position of the start-stop mark, sk indicates the start frame of the kth active segment, ek+1 indicates the end frame of the (k+1)th active segment, scaleshort indicates the minimum scaling, and scalelong indicates the maximum scaling.

Illustration is made by taking that the initial position of the start-stop mark is the 10th frame, the start frame of the kth active segment is the 26th frame, and the end frame of the (k+1)th active segment is the 45th frame as an example. As can be obtained from the above formulas, the minimum value of the third forward duration is 21.25 frames, and the maximum value of the third forward duration is 28.8 frames. According to the minimum value of the third forward duration and the maximum value of the third forward duration, the fourth forward duration interval is determined to be [21.25, 28.8]. When or in response to determining that the duration of the to-be-matched voice segment is 25 frames, the to-be-matched voice segment is within the fourth forward duration interval, and further, it may be obtained according to the formulas that the duration of the to-be-matched active segment is 20.25 frames.

The first voice segment is calculated by the following formula:

$$[1, scale_{long}*(s_k-\text{Index}+1)-1].$$

The second voice segment is calculated by the following formula:

$$l_i=-scale_{long}*(s_k-\text{Index}+1),$$

where Index indicates the initial position of the start-stop mark, sk indicates the start frame of the kth active segment, scalelong indicates the maximum scaling, and li indicates the duration of the to-be-matched voice segment.

Therefore, as can be obtained from the formulas, the first voice segment is from the first frame to the 20.25th frame, and the duration of the second voice segment is 3.75 frames. Moreover, the to-be-matched voice segment is within the fourth forward duration interval, the condition for updating the position of the start-stop mark is met, and therefore, the initial position of the start-stop mark may be updated to the position corresponding to the start frame of the kth active segment. That is, the initial position of the start-stop mark is changed from the 10th frame to the 26th frame. The second voice segment obtained above may match the corresponding action segment according to the updated initial position of the start-stop mark.

In the embodiments of the present disclosure, a method for acquiring a to-be-matched active segment is provided. Through the above method, the matching accuracy may be improved, thereby improving the matching degree of voice segments and active segments in the video, and improving the authenticity of the video.

In certain embodiment(s), based on the embodiment corresponding to FIG. 4, in another optional embodiment of the sound-picture matching method of a video provided by the embodiments of the present disclosure, when or in response to determining that the moving direction of the start-stop mark is a reverse direction, and the initial position of the start-stop mark is greater than or equal to a start frame of a pth (p is an integer greater than or equal to 1 and less than or equal to N) active segment, acquiring the to-be-matched active segment according to the initial position of the start-stop mark, the moving direction of the start-stop mark, and the to-be-matched voice segment may include: determining a minimum value of a first reverse duration according to a minimum scaling, the initial position of the start-stop mark, and the start frame of the pth active segment; determining a maximum value of the first reverse duration according to a maximum scaling, the initial position of the start-stop mark, and an end frame of a (p−1)th active segment; determining a target reverse duration interval according to the minimum value of the first reverse duration and the maximum value of the first reverse duration; and determining, when or in response to determining that the to-be-matched voice segment is within the target reverse duration interval, the to-be-matched active segment according to at least one of the pth active segment and the (p−1)th active segment.

The sound-picture matching method of a video further includes: updating the initial position of the start-stop mark when or in response to determining that a condition for updating the position of the start-stop mark is met; and adjusting the moving direction of the start-stop mark to be a forward direction when or in response to determining that the updated initial position of the start-stop mark is less than or equal to a position corresponding to a start frame of the first active segment.

In this embodiment, when or in response to determining that the moving direction of the start-stop mark is the reverse direction, and the initial position of the start-stop mark is greater than or equal to the start frame of the pth active segment, the sound-picture matching apparatus may determine the minimum value of the first reverse duration and the maximum value of the first reverse duration, then determine the target reverse duration interval. When or in response to determining that the to-be-matched voice segment is within the target reverse duration interval, the to-be-matched active segment may be determined. When or in response to determining that the condition for updating the position of the start-stop mark is met, the initial position of the start-stop mark is updated. When or in response to determining that the updated initial position of the start-stop mark is less than or equal to the position corresponding to the start frame of the first active segment, the moving direction of the start-stop mark is adjusted to the forward direction.

In certain embodiment(s), illustration is made by using the minimum scaling of 0.8 and the maximum scaling of 1.25 as examples. The minimum value of the first reverse duration may be calculated by the following formula:

$$scale_{short}*(\text{Index}-s_p+1).$$

The maximum value of the first reverse duration may be calculated by the following formula:

$$scale_{long}*(\text{Index}-e_{p-1}+1).$$

The target reverse duration interval may be calculated by the following formula:

$$[scale_{short}*(\text{Index}-s_p+1), scale_{long}*(\text{Index}-e_{p-1}+1)],$$

where Index indicates the initial position of the start-stop mark, scaleshort indicates the minimum scaling, sp indicates the start frame of the pth active segment, scalelong indicates the maximum scaling, ep−1 indicates the end frame of the (p−1)th active segment.

Figure 12:
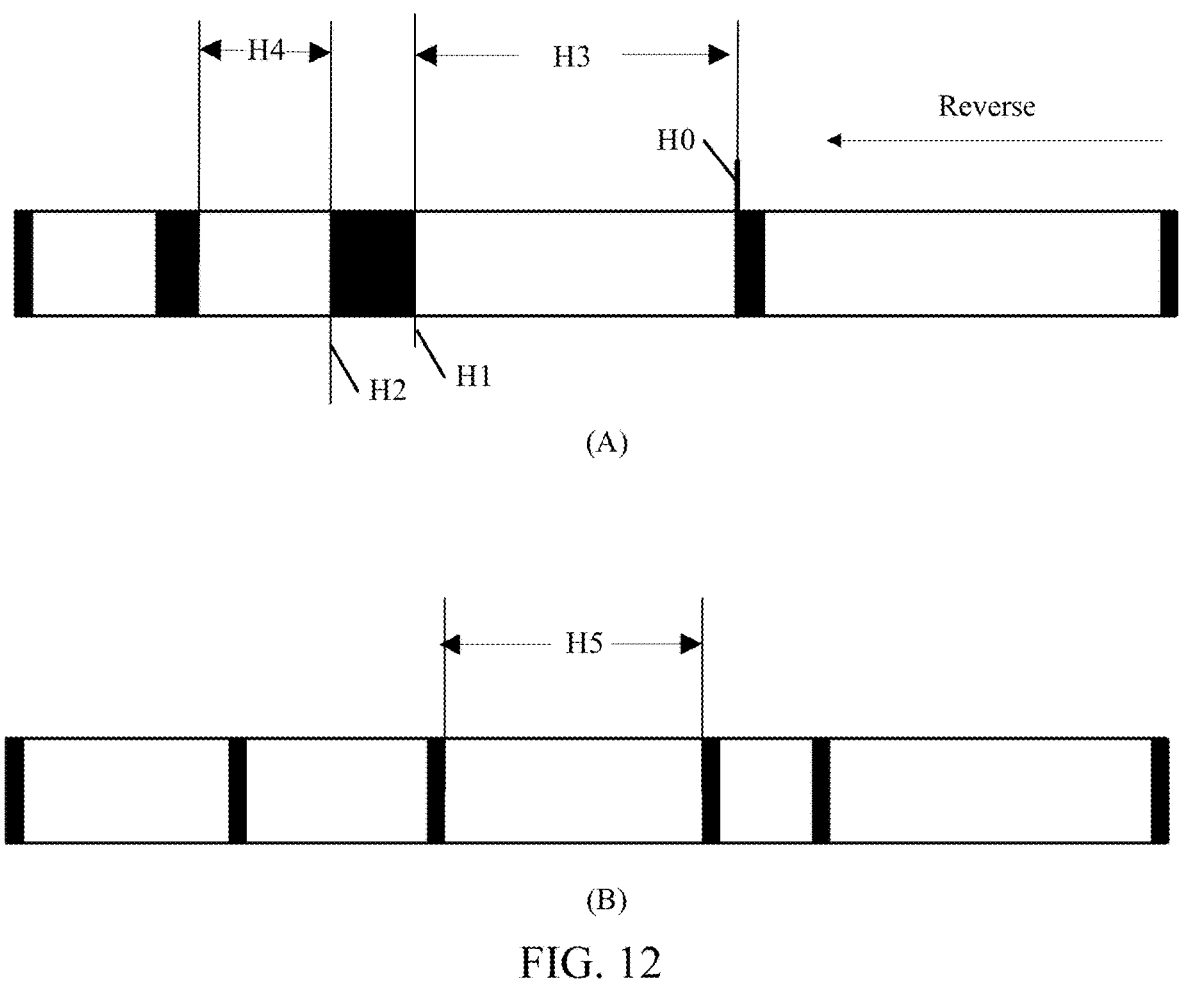
FIG. 12 is a schematic diagram of another embodiment of determining a to-be-matched active segment according to embodiment(s) of the present disclosure.

For ease of understanding, when or in response to determining that the moving direction of the start-stop mark is the reverse direction, illustration is made by taking that the initial position of the start-stop mark is the 18th frame of the image sequence, the start frame of the pth active segment is the 11th frame, and the end frame of the (p−1)th active segment is the 9th frame as an example. Referring to FIG. 12, which is a schematic diagram of another embodiment of determining a to-be-matched active segment according to an embodiment of the present disclosure. As shown in FIG. 12, H0 shown in FIG. 12(A) indicates the initial position Index of the start-stop mark, that is, the 18th frame of the image sequence. H1 indicates the start frame sp of the pth active segment, that is, the 11th frame of the image sequence. H2 indicates the end frame ep−1 of the (p−1)th active segment, that is, the 9th frame of the image sequence. H3 indicates the length of the pth active segment, and H4 indicates the length of the (p−1)th active segment.

As can be obtained from the formulas, the minimum value of the first reverse duration is 6.4 frames, and the maximum value of the first reverse duration is 12.5 frames, so that it may be obtained that the target reverse duration interval is [6.4, 12.5]. When or in response to determining that the duration of the to-be-matched voice segment is within [6.4, 12.5], that is, the to-be-matched voice segment H5 as shown in FIG. 12(B), a to-be-matched active segment may be determined according to at least one of the active segment H3 and the active segment H4.

When or in response to determining that the condition for updating the position of the start-stop mark is met, the sound-picture matching apparatus may further update the initial position of the start-stop mark. When or in response to determining that the updated initial position of the start-stop mark is less than or equal to the position corresponding to the start frame of the first active segment, the moving direction of the start-stop mark is adjusted to the forward direction. In other words, when or in response to determining that the moving direction of the start-stop mark is the reverse direction, and the updated initial position of the start-stop mark has exceeded the first frame of the first active segment in the image sequence, the moving direction of the start-stop mark may be changed to the forward direction. The matching method in the forward direction has been introduced in the embodiments, and will not be repeated here. By updating and adjusting the moving direction of the start-stop mark from the forward direction to the reverse direction, the real-time inputted voice sequence can be matched, thereby generating a video with high authenticity in real time.

In the embodiments of the present disclosure, another method for acquiring a to-be-matched active segment is provided. Through the above method, the synthesized video is more in line with a scenario of the actual voice description of the object, and the video is more realistic. In addition, by matching the active segment with the next active segment, to-be-matched active segments corresponding to different to-be-matched voice segments are connected end to end, thereby improving the consistency and continuity of voices and images in the synthesized video segments.

In certain embodiment(s), based on the embodiment corresponding to FIG. 4, in another optional embodiment of the sound-picture matching method of a video provided by the embodiments of the present disclosure, determining the to-be-matched active segment according to at least one of the pth active segment and the (p−1)th active segment may include: determining a minimum value of a second reverse duration according to the initial position of the start-stop mark and a start frame of the pth active segment, where the minimum value of the second reverse duration is greater than the minimum value of the first reverse duration; determining a first reverse duration interval according to the minimum value of the first reverse duration and the minimum value of the second reverse duration; and scaling, when or in response to determining that the to-be-matched voice segment is within the first reverse duration interval, a duration between the start frame of the pth active segment and the initial position of the start-stop mark according to a duration of the to-be-matched voice segment to obtain the to-be-matched active segment.

The updating the initial position of the start-stop mark when or in response to determining that a condition for updating the position of the start-stop mark is met may include: meeting the condition for updating the position of the start-stop mark when or in response to determining that the to-be-matched voice segment is within the first reverse duration interval; and updating the initial position of the start-stop mark to a position corresponding to the start frame of the pth active segment.

In this embodiment, the sound-picture matching apparatus may determine the first reverse duration interval according to the minimum value of the first reverse duration and the minimum value of the second reverse duration. When or in response to determining that the to-be-matched voice segment is within the first reverse duration interval, the duration between the start frame of the pth active segment and the initial position of the start-stop mark is scaled according to the duration of the to-be-matched voice segment to obtain the to-be-matched active segment. When or in response to determining that the to-be-matched voice segment is within the first reverse duration interval, it indicates that the condition for updating the position of the start-stop mark is met, and the initial position of the start-stop mark may be updated to the position corresponding to the start frame of the pth active segment.

In certain embodiment(s), the minimum value of the second reverse duration may be calculated by the following formula:

$$\text{Index}-s_p+1.$$

The first reverse duration interval may be calculated by the following formula:

$$[\text{scale}_{short}*(\text{Index}-s_p+1), \text{Index}-s_p+1],$$

where Index indicates the initial position of the start-stop mark, scaleshort indicates the minimum scaling, and sp indicates the start frame of the pth active segment.

Figure 13:
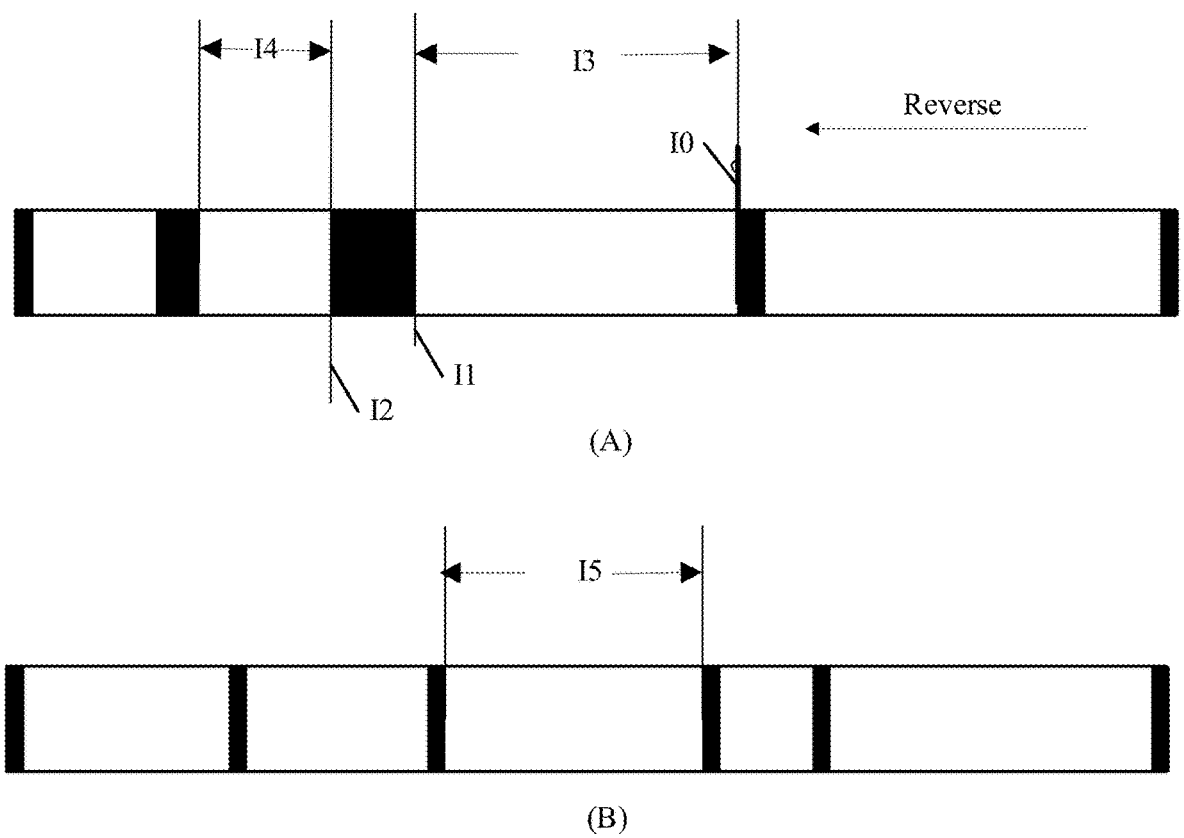
FIG. 13 is a schematic diagram of another embodiment of determining a to-be-matched active segment according to embodiment(s) of the present disclosure.

For ease of understanding, illustration is made by taking that the initial position of the start-stop mark is the 18th frame of the image sequence (the end frame of the pth active segment), the start frame of the pth active segment is the 11th frame, the end frame of the (p−1)th active segment is the 9th frame, and the duration of the to-be-matched voice segment is 7 frames as an example. Referring to FIG. 13, which is a schematic diagram of another embodiment of acquiring a to-be-matched active segment according to an embodiment of the present disclosure. As shown in FIG. 13, I0 shown in FIG. 13(A) indicates the initial position Index of the start-stop mark, and is the 18th frame. I1 indicates the start frame sp of the pth active segment, and is the 11th frame of the image sequence. I2 indicates the end frame ep−1 of the (p−1)th active segment, and is the 9th frame of the image sequence. I3 indicates the length of the pth active segment, and I4 indicates the length of the (p−1)th active segment.

As can be obtained from the formulas, the minimum value of the first reverse duration is 6.4 frames, and the minimum value of the second reverse duration is 8 frames, so that it may be obtained that the first reverse duration interval is [6.4, 8]. The duration of the to-be-matched voice segment I5 shown in FIG. 13(B) is 7 frames, that is, the duration of the to-be-matched voice segment is within the first reverse duration interval. Therefore, the duration between the start frame of the pth active segment and the initial position of the start-stop mark may be scaled according to the duration of the to-be-matched voice segment I5. For example, the duration of the pth active segment is scaled to 7 frames, thereby matching the to-be-matched voice segment I5.

When or in response to determining that the duration of the to-be-matched voice segment is within the first forward duration interval, the condition for updating the position of the start-stop mark is met, and therefore, the initial position of the start-stop mark may be updated to the position corresponding to the start frame of the pth active segment. That is, the initial position of the start-stop mark is changed from the 18th frame to the 11th frame.

In certain embodiment(s), based on the embodiment corresponding to FIG. 4, in another optional embodiment of the sound-picture matching method of a video provided by the embodiments of the present disclosure, determining the to-be-matched active segment according to at least one of the pth active segment and the (p−1)th active segment may include: determining a maximum value of the second reverse duration according to the initial position of the start-stop mark and an end frame of the (p−1)th active segment, where the maximum value of the second reverse duration is less than the maximum value of the first reverse duration; determining a second reverse duration interval according to the maximum value of the first reverse duration and the maximum value of the second reverse duration; and scaling, when or in response to determining that the to-be-matched voice segment is within the second reverse duration interval, a duration between the end frame of the (p−1)th active segment and the initial position of the start-stop mark according to a duration of the to-be-matched voice segment to obtain the to-be-matched active segment.

The updating the initial position of the start-stop mark when or in response to determining that a condition for updating the position of the start-stop mark is met may include: meeting the condition for updating the position of the start-stop mark when or in response to determining that the to-be-matched voice segment is within the second reverse duration interval; and updating the initial position of the start-stop mark to a position corresponding to the end frame of the (p−1)th active segment.

In this embodiment, the sound-picture matching apparatus may determine the second reverse duration interval according to the maximum value of the first reverse duration and the maximum value of the second reverse duration. When or in response to determining that the to-be-matched voice segment is within the second reverse duration interval, the duration between the end frame of the (p−1)th active segment and the initial position of the start-stop mark is scaled according to the duration of the to-be-matched voice segment to obtain the to-be-matched active segment. When or in response to determining that the to-be-matched voice segment is within the second reverse duration interval, it indicates that the condition for updating the position of the start-stop mark is met, and the initial position of the start-stop mark may be updated to the position corresponding to the end frame of the (p−1)th active segment.

In certain embodiment(s), the maximum value of the second reverse duration may be calculated by the following formula:

$$\text{Index} - e_{p-1} + 1.$$

The second reverse duration interval may be calculated by the following formula:

$$[\text{Index} - e_{p-1} + 1, \text{scale}_{long} * (\text{Index} - e_{p-1} + 1)],$$

where Index indicates the initial position of the start-stop mark, scalelong indicates the maximum scaling, and ep−1 indicates the end frame of the (p−1)th active segment.

Figure 14:
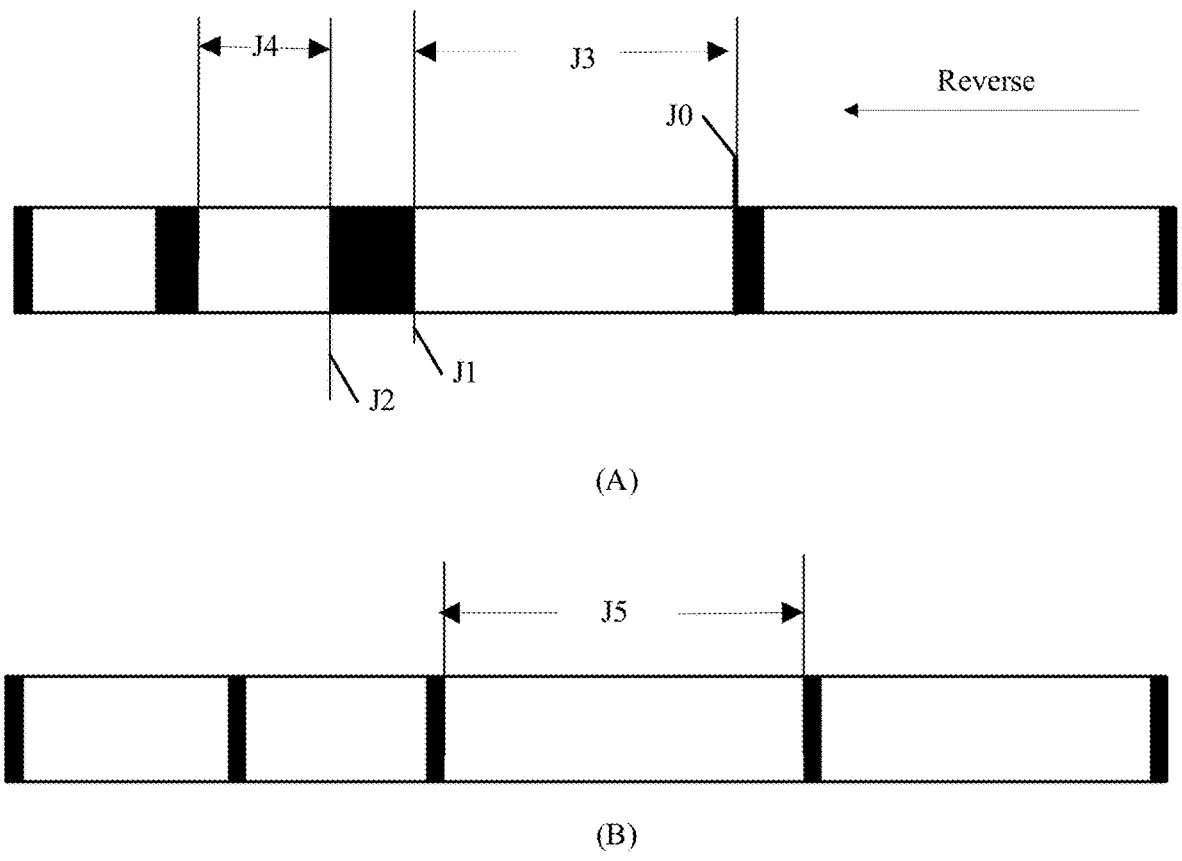
FIG. 14 is a schematic diagram of another embodiment of determining a to-be-matched active segment according to embodiment(s) of the present disclosure.

For ease of understanding, illustration is made by taking that the initial position of the start-stop mark is the 18th frame of the image sequence (the end frame of the pth active segment), the start frame of the pth active segment is the 11th frame, the end frame of the (p−1)th active segment is the 9th frame, and the duration of the to-be-matched voice segment is 11 frames as an example. Referring to FIG. 14, which is a schematic diagram of another embodiment of acquiring a to-be-matched active segment according to an embodiment of the present disclosure. As shown in FIG. 14, J0 shown in FIG. 14(A) indicates the initial position Index of the start-stop mark, and is the 18th frame. J1 indicates the start frame sp of the pth active segment, and is the 11th frame of the image sequence. J2 indicates the end frame ep−1 of the (p−1)th active segment, and is the 9th frame of the image sequence. J3 indicates the length of the pth active segment, and J4 indicates the length of the (p−1)th active segment.

As can be obtained from the formulas, the maximum value of the first reverse duration is 12.5 frames, and the maximum value of the second reverse duration is 10 frames, so that it may be obtained that the second reverse duration interval is [10, 12.5]. The to-be-matched voice segment J5 shown in FIG. 14(B) is 11 frames, that is, the duration of the to-be-matched voice segment is within the second reverse duration interval. Therefore, the duration between the end frame of the (p−1)th active segment and the initial position of the start-stop mark may be scaled according to the duration of the to-be-matched voice segment J5. For example, the duration between J2 and J0 is scaled to 11 frames. In this way, a to-be-matched active segment having a duration identical to that of the to-be-matched voice segment J5 may be obtained.

When or in response to determining that the duration of the to-be-matched voice segment is within the second reverse duration interval, the condition for updating the position of the start-stop mark is met, and therefore, the initial position of the start-stop mark may be updated to the position corresponding to the end frame of the (p−1)th active segment. That is, the initial position of the start-stop mark is changed from the 18th frame to the 9th frame.

In certain embodiment(s), based on the embodiment corresponding to FIG. 4, in another optional embodiment of the sound-picture matching method of a video provided by the embodiments of the present disclosure, determining the to-be-matched active segment according to at least one of the pth active segment and the (p−1)th active segment may include: determining a minimum value of the second reverse duration according to the initial position of the start-stop mark and the start frame of the pth active segment, where the minimum value of the second reverse duration is greater than the minimum value of the first reverse duration; determining a maximum value of the second reverse duration according to the initial position of the start-stop mark and an end frame of the (p−1)th active segment, where the maximum value of the second reverse duration is less than the maximum value of the first reverse duration; determining a third reverse duration interval according to the minimum value of the second reverse duration and the maximum value of the second reverse duration; and determining, when or in response to determining that the to-be-matched voice segment is within the third reverse duration interval, the to-be-matched active segment according to the initial position of the start-stop mark and the duration of the to-be-matched voice segment.

The updating the initial position of the start-stop mark when or in response to determining that a condition for updating the position of the start-stop mark is met may include: meeting the condition for updating the position of the start-stop mark when or in response to determining that the to-be-matched voice segment is within the third reverse duration interval; and updating the initial position of the start-stop mark to a position corresponding to a start frame of the to-be-matched active segment.

In this embodiment, the sound-picture matching apparatus determines the third reverse duration interval according to the minimum value of the second reverse duration and the maximum value of the second reverse duration. When or in response to determining that the to-be-matched voice segment is within the third reverse duration interval, the to-be-matched active segment is determined according to the initial position of the start-stop mark and the duration of the to-be-matched voice segment. When or in response to determining that the to-be-matched voice segment is within the third reverse duration interval, it indicates that the condition for updating the position of the start-stop mark is met, and the initial position of the start-stop mark is updated to the position corresponding to the start frame of the to-be-matched active segment.

In certain embodiment(s), the third reverse duration interval may be calculated by the following formula:

$$[\text{Index}-s_p+1, \text{Index}-e_{p-1}+1],$$

where Index indicates the initial position of the start-stop mark, sp indicates the start frame of the pth active segment, and ep−1 indicates the end frame of the (p−1)th active segment.

Figure 15:
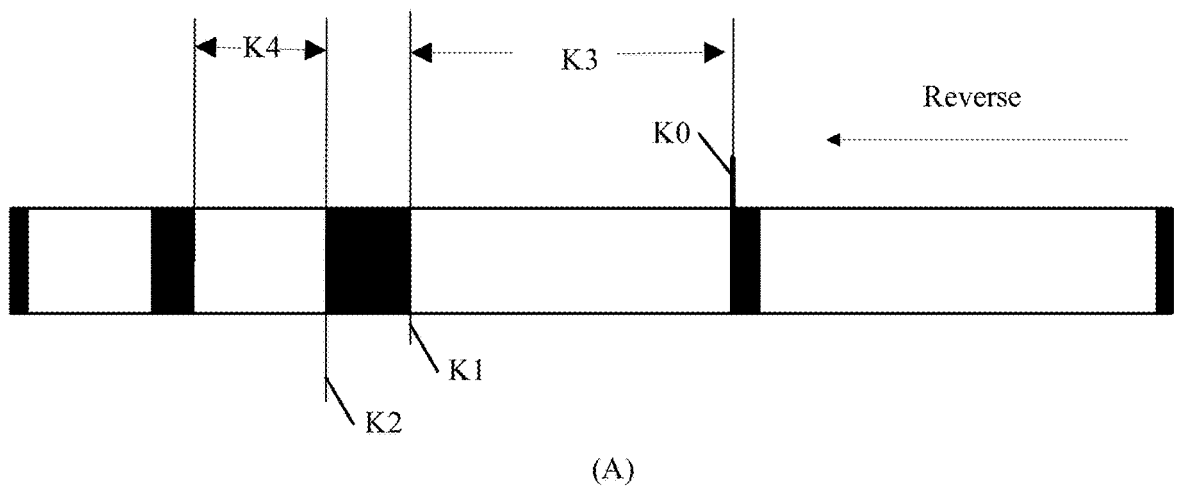
FIG. 15 is a schematic diagram of another embodiment of determining a to-be-matched active segment according to embodiment(s) of the present disclosure.
Figure 15:
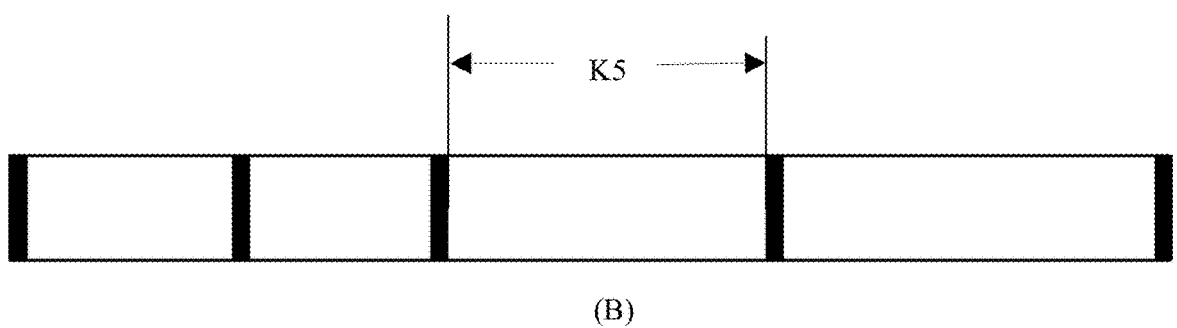

For ease of understanding, illustration is made by taking that the initial position of the start-stop mark is the 18th frame of the image sequence (the end frame of the pth active segment), the start frame of the pth active segment is the 11th frame, the end frame of the (p−1)th active segment is the 9th frame, and the duration of the to-be-matched voice segment is 9 frames as an example. Referring to FIG. 15, which is a schematic diagram of another embodiment of acquiring a to-be-matched active segment according to an embodiment of the present disclosure. As shown in FIG. 15, K0 shown in FIG. 15(A) indicates the initial position Index of the start-stop mark, and is the 18th frame. K1 indicates the start frame sp of the pth active segment, and is the 11th frame of the image sequence. K2 indicates the end frame ep−1 of the (p−1)th active segment, and is the 9th frame of the image sequence. K3 indicates the length of the pth active segment, and K4 indicates the length of the (p−1)th active segment.

As can be obtained from the formulas, the minimum value of the second reverse duration is 8 frames, and the maximum value of the second reverse duration is 10 frames, so that it may be obtained that the third reverse duration interval is [8, 10]. The duration of the to-be-matched voice segment K5 shown in FIG. 15(B) is 9 frames, that is, the duration of the to-be-matched voice segment is within the third reverse duration interval, and therefore, the to-be-matched active segment may be determined according to the initial position K0 of the start-stop mark and the duration of the to-be-matched voice segment K5 by using the following method:

$$[\text{Index}-l_i+1, \text{Index}],$$

where Index indicates the initial position of the start-stop mark, and li indicates the length of the to-be-matched voice segment. Assuming that the length of the to-be-matched voice segment is 9 frames, that is, the to-be-matched active segment is indicated as an active segment between the 10th frame and the 18th frame.

When or in response to determining that the duration of the to-be-matched voice segment is within the third reverse duration interval, the condition for updating the position of the start-stop mark is met, and therefore, the initial position of the start-stop mark may be updated to the position corresponding to the start frame of the to-be-matched active segment. That is, the initial position of the start-stop mark is changed from the 18th frame to the 11th frame, thereby ensuring that the initial position of the start-stop mark is located in a silent segment.

In the embodiments of the present disclosure, another method for acquiring a to-be-matched active segment is provided. Through the above method, different methods may be used to acquire the to-be-matched active segment when or in response to determining that the length of the to-be-matched voice segment is different, thereby improving the diversity of a matching algorithm. Moreover, the updated initial position of the start-stop mark falls within the silent segment, allowing the active segment to be voiced, so that the synthesized video is improved to be more natural. Further, the matching method provided by the present disclosure is simple in calculation, may be used for real-time calculation, and can synthesize video segments online.

In certain embodiment(s), based on the embodiment corresponding to FIG. 4 above, in another optional embodiment of a sound-picture matching method of a video provided by the embodiments of the present disclosure, after determining the target reverse duration interval according to the minimum value of the first reverse duration and the maximum value of the first reverse duration, the sound-picture matching method of a video further includes: determining, when or in response to determining that the to-be-matched voice segment is not within the target reverse duration interval, and the duration of the to-be-matched voice segment is less than the minimum value of the first reverse duration, the to-be-matched active segment according to the duration of the to-be-matched voice segment as well as the initial position and a moving radius of the start-stop mark; or, determining, when or in response to determining that the to-be-matched voice segment is not within the target reverse duration interval, and the duration of the to-be-matched voice segment is less than the minimum value of the first reverse duration, the to-be-matched active segment according to the duration of the to-be-matched voice segment and the initial position of the start-stop mark.

In this embodiment, when or in response to determining that the to-be-matched voice segment is not within the target reverse duration interval, and the duration of the to-be-matched voice segment is less than the minimum value of the first reverse duration, the sound-picture matching apparatus may determine the to-be-matched active segment by using a two-way swing value taking method, or the sound-picture matching apparatus may take several frames towards the direction of the silent segment to obtain the to-be-matched active segment.

To facilitate understanding, illustration is made by taking that the initial position of the start-stop mark is the 18th frame (the end frame of the pth active segment), the start frame of the pth active segment is the 11th frame, the end frame of the (p−1)th active segment is the 9th frame, and the duration of the to-be-matched voice segment is 2 frames as an example. As can be obtained from the above formulas, the target reverse duration interval is [6.4, 12.5]. Therefore, the to-be-matched voice segment is not within the target reverse duration interval, and is less than the minimum value of the first reverse duration, that is, 6.4. As a result, a to-be-matched active segment may be obtained by using the initial position of the start-stop mark as a center and moving back and forth in the active segment with a moving radius r.

In certain embodiment(s), the moving radius is usually an integer greater than or equal to 1 and less than or equal to 5, and the initial position of the start-stop mark is not updated. Assuming that the radius is 2 and the initial position of the start-stop mark is the 18th frame, then the 18th frame, the 17th frame, the 18th frame, the 19th frame, the 18th frame, the 17th frame, the 18th frame, the 19th frame, the 18th frame, the 17th frame, the 18th frame, and the like may be obtained, and so on. Based on the duration of the to-be-matched voice segment, the corresponding frames are acquired in sequence. Assuming that the duration of the to-be-matched voice segment is 2 frames, that is, the first 2 frames of image, namely the 17th frame and the 18th frame, are taken from the above sequence.

In certain embodiment(s), there are two methods for designing an active segment.

In the embodiments of the present disclosure, a method for acquiring a to-be-matched active segment is provided. Through the above method, when or in response to determining that the voice segment is too short, a silent segment may be matched, so that the synthesized video does not appear too obtrusive, thereby improving the authenticity of the video.

In certain embodiment(s), based on the embodiment corresponding to FIG. 4 above, in another optional embodiment of a sound-picture matching method of a video provided by the embodiments of the present disclosure, after determining the target reverse duration interval according to the minimum value of the first reverse duration and the maximum value of the first reverse duration, the sound-picture matching method of a video further includes: acquiring, when or in response to determining that the to-be-matched voice segment is not within the target reverse duration interval, and the duration of the to-be-matched voice segment is greater than the maximum value of the first reverse duration, a qth active segment from the image sequence, where q is an integer greater than or equal to 1 and less than or equal to N; determining a minimum value of a third reverse duration according to the maximum scaling, the initial position of the start-stop mark, and an end frame of the qth active segment; determining a maximum value of the third reverse duration according to the minimum scaling, the initial position of the start-stop mark, and a start frame of a (q−1)th active segment; determining a fourth reverse duration interval according to the minimum value of the third reverse duration and the maximum value of the third reverse duration; determining, when or in response to determining that the to-be-matched voice segment is within the fourth reverse duration interval, a duration of the to-be-matched active segment according to the initial position of the start-stop mark, the maximum scaling, and the end frame of the qth active segment; and dividing, according to the duration of the to-be-matched active segment, the to-be-matched voice segment into a third voice segment and a fourth voice segment, where a duration of the third voice segment is consistent with the duration of the to-be-matched active segment, and the fourth voice segment is used for matching a corresponding action segment according to the updated position of the start-stop mark.

The updating the initial position of the start-stop mark when or in response to determining that a condition for updating the position of the start-stop mark is met may include: meeting the condition for updating the position of the start-stop mark when or in response to determining that the to-be-matched voice segment is within the fourth forward duration interval; and updating the initial position of the start-stop mark to a position corresponding to the end frame of the qth active segment.

In this embodiment, when or in response to determining that the to-be-matched voice segment is too long, the sound-picture matching apparatus may acquire the qth active segment from the image sequence, and then determine the minimum value of the third reverse duration and the maximum value of the third reverse duration, thereby determining the fourth reverse duration interval. When or in response to determining that the to-be-matched voice segment is within the fourth reverse duration interval, the duration of the to-be-matched active segment is determined, so that the to-be-matched voice segment is divided into the third voice segment and the fourth voice segment. The fourth voice segment is used for matching a corresponding action segment according to the updated initial position of the start-stop mark, that is, the fourth voice segment is used as a to-be-matched voice segment of the next round for performing sound-picture matching again. When or in response to determining that the to-be-matched voice segment is within the fourth forward duration interval, it indicates that the condition for updating the position of the start-stop mark is met, and then the initial position of the start-stop mark may be updated to the position corresponding to the end frame of the qth active segment.

In certain embodiment(s), illustration is made by taking that the initial position of the start-stop mark is the 38th frame (the end frame of the pth active segment), the start frame of the pth active segment is the 31st frame, the end frame of the (p−1)th active segment is the 29th frame, and the duration of the to-be-matched voice segment is 15 frames as an example. As can be obtained from the above formulas, the target reverse duration interval is [6.4, 12.5]. The maximum value of the first forward duration is 12.5 frames, and therefore, the to-be-matched voice segment is not within the target reverse duration interval and is greater than the maximum value of the first reverse duration; therefore, the qth active segment may be acquired.

The minimum value of the third reverse duration may be calculated by the following formula:

$$\text{scale}_{long}*(\text{Index}-e_q+1).$$

The maximum value of the third reverse duration may be calculated by the following formula:

$$\text{scale}_{short}*(\text{Index}-s_{q-1}+1).$$

The fourth reverse duration interval may be calculated by the following formula:

$$[\text{scale}_{long}*(\text{Index}-e_q+1), \text{scale}_{short}*(\text{Index}-s_{q-1}+1)].$$

The duration of the to-be-matched active segment may be calculated by the following formula:

$$\text{scale}_{long}*(\text{Index}-e_q+1)-1,$$

where Index indicates the initial position of the start-stop mark, eq indicates the end frame of the qth active segment, sq−1 indicates the start frame of the (q−1)th active segment, scaleshort indicates the minimum scaling, and scalelong indicates the maximum scaling.

Illustration is made by taking that the initial position of the start-stop mark is the 38th frame of the image sequence (the end frame of the pth active segment), the start frame of the (q−1)th active segment is the 9th frame, and the end frame of the qth active segment is the 29th frame as an example. As can be obtained from the above formulas, the minimum value of the third reverse duration is 12.5 frames, and the maximum value of the third reverse duration is 24 frames. According to the minimum value of the third reverse duration and the maximum value of the third reverse duration, the fourth reverse duration interval is determined to be [12.5, 24]. When or in response to determining that the duration of the to-be-matched voice segment is 15 frames, the to-be-matched voice segment is within the fourth reverse duration interval, and further, it may be obtained according to the formulas that the duration of the to-be-matched active segment is 11.5 frames.

The third voice segment is calculated by the following formula:

$$[1, \text{scale}_{long}*(\text{Index}-e_q+1)].$$

The fourth voice segment is calculated by the following formula:

$$[l_i = l_i - \text{scale}_{long}*(\text{Index}-e_q+1)],$$

where Index indicates the initial position of the start-stop mark, eq indicates the end frame of the qth active segment, scalelong indicates the maximum scaling, and li indicates the duration of the to-be-matched voice segment.

Therefore, as can be obtained from the formulas, the third voice segment is from the first frame to the 11.5th frame, and the duration of the fourth voice segment is 2.5 frames. Moreover, the to-be-matched voice segment is within the fourth reverse duration interval, it indicates that the condition for updating the position of the start-stop mark is met, and therefore, the initial position of the start-stop mark may be updated to the position corresponding to the end frame of the qth active segment. That is, the initial position of the start-stop mark is changed from the 38th frame to the 29th frame. The fourth voice segment obtained above may match the corresponding action segment according to the updated position of the start-stop mark.

In the embodiments of the present disclosure, a method for acquiring a to-be-matched active segment is provided. Through the above method, the accuracy of matching may be improved. In this way, it can be ensured that the synthesized video segments have a more realistic visual effect, that is, a scenario of a character speaking in the video segments is more realistic and is close to the effect of the character speaking in a real scenario, which is difficult for people to recognize that the voices and images in the video segments are synthesized.

Figure 16:
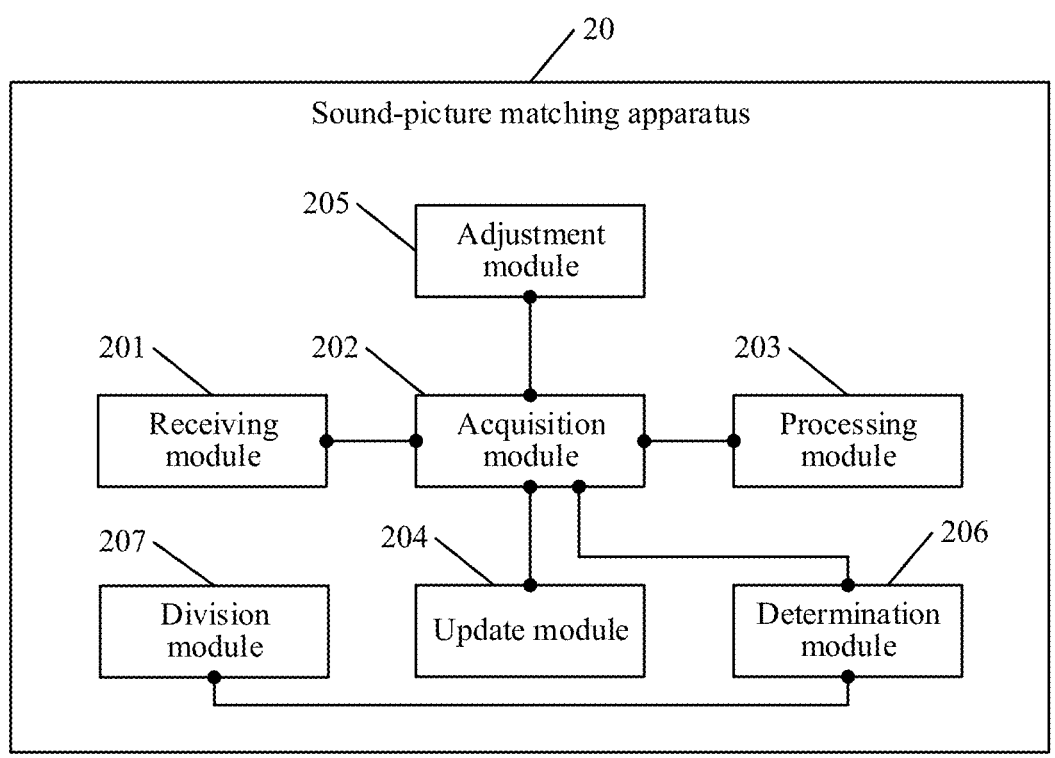
FIG. 16 is a schematic diagram of an embodiment of a sound-picture matching apparatus according to embodiment(s) of the present disclosure.

The sound-picture matching apparatus in the present disclosure will be described in detail below. Referring to FIG. 16, which is a schematic diagram of an embodiment of a sound-picture matching apparatus according to an embodiment of the present disclosure. The sound-picture matching apparatus 20 includes: a receiving module 201 configured to acquire a voice sequence, the voice sequence including M voice segments, and M being an integer greater than or equal to 1; an acquisition module 202 configured to acquire a to-be-matched voice segment from the voice sequence, the to-be-matched voice segment belonging to any voice segment in the voice sequence; the acquisition module 202 being further configured to acquire an initial position of a start-stop mark and a moving direction of the start-stop mark from an image sequence, the image sequence including N active segments, each active segment including an action picture of an object, the initial position of the start-stop mark being a start frame of the active segment or an end frame of the active segment, and N being an integer greater than or equal to 1; the acquisition module 202 being further configured to determine a to-be-matched active segment according to the initial position of the start-stop mark, the moving direction of the start-stop mark, and the to-be-matched voice segment; and a processing module 203 configured to synthesize the to-be-matched voice segment and the to-be-matched active segment to obtain a video segment, the video segment including the action picture of the object and a voice of the object.

In certain embodiment(s), based on the above embodiment corresponding to FIG. 16, in another embodiment of the sound-picture matching apparatus 20 provided by the embodiments of the present disclosure, the sound-picture matching apparatus 20 further includes an update module 204 and an adjustment module 205.

The acquisition module 202 is In certain embodiment(s) configured to, when or in response to determining that the moving direction of the start-stop mark is a forward direction, and the initial position of the start-stop mark is less than or equal to a start frame of a jth active segment, determine a minimum value of a first forward duration according to a minimum scaling, the initial position of the start-stop mark, and an end frame of the jth active segment, where j is an integer greater than or equal to 1 and less than or equal to (N+1); determine a maximum value of the first forward duration according to a maximum scaling, the initial position of the start-stop mark, and a start frame of a (j+1)th active segment; determine a target forward duration interval according to the minimum value of the first forward duration and the maximum value of the first forward duration; and determine, when or in response to determining that the to-be-matched voice segment is within the target forward duration interval, the to-be-matched active segment according to at least one of the jth active segment and the (j+1)th active segment.

The update module 204 is configured to update the initial position of the start-stop mark when or in response to determining that a condition for updating the position of the start-stop mark is met.

The adjustment module 205 is configured to adjust the moving direction of the start-stop mark to be a reverse direction when or in response to determining that the updated initial position of the start-stop mark is greater than or equal to a position corresponding to an end frame of an Nth active segment.

In certain embodiment(s), based on the above embodiment corresponding to FIG. 16, in another embodiment of the sound-picture matching apparatus 20 provided by the embodiments of the present disclosure, the acquisition module 202 is configured to determine a minimum value of a second forward duration according to the initial position of the start-stop mark and the end frame of the jth active segment, where the minimum value of the second forward duration is greater than the minimum value of the first forward duration; determine a first forward duration interval according to the minimum value of the first forward duration and the minimum value of the second forward duration; and scale, when or in response to determining that the to-be-matched voice segment is within the first forward duration interval, a duration between the initial position of start-stop mark and the end frame of the jth active segment according to a duration of the to-be-matched voice segment to obtain the to-be-matched active segment.

In certain embodiment(s), the update module 204 is configured to meet the condition for updating the position of the start-stop mark when or in response to determining that the to-be-matched voice segment is within the first forward duration interval; and update the initial position of the start-stop mark to the position corresponding to the end frame of the jth active segment.

In certain embodiment(s), based on the above embodiment corresponding to FIG. 16, in another embodiment of the sound-picture matching apparatus 20 provided by the embodiments of the present disclosure, the acquisition module 202 is configured to determine a maximum value of the second forward duration according to the initial position of the start-stop mark and an end frame of the (j+1)th active segment, where the maximum value of the second forward duration is less than the maximum value of the first forward duration; determine a second forward duration interval according to the maximum value of the first forward duration and the maximum value of the second forward duration; and scale, when or in response to determining that the to-be-matched voice segment is within the second forward duration interval, a duration between the initial position of the start-stop mark and a start frame of the (j+1)th active segment according to a duration of the to-be-matched voice segment to obtain the to-be-matched active segment.

In certain embodiment(s), the update module 204 is configured to meet the condition for updating the position of the start-stop mark when or in response to determining that the to-be-matched voice segment is within the second forward duration interval; and update the initial position of the start-stop mark to a position corresponding to the start frame of the (j+1)th active segment.

In certain embodiment(s), based on the above embodiment corresponding to FIG. 16, in another embodiment of the sound-picture matching apparatus 20 provided by the embodiments of the present disclosure, the acquisition module 202 is configured to determine a minimum value of a second forward duration according to the initial position of the start-stop mark and the end frame of the jth active segment, where the minimum value of the second forward duration is greater than the minimum value of the first forward duration; determine a maximum value of the second forward duration according to the initial position of the start-stop mark and an end frame of the (j+1)th active segment, where the maximum value of the second forward duration is less than the maximum value of the first forward duration; determine a third forward duration interval according to the minimum value of the second forward duration and the maximum value of the second forward duration; and determine, when or in response to determining that the to-be-matched voice segment is within the third forward duration interval, the to-be-matched active segment according to the initial position of the start-stop mark and the duration of the to-be-matched voice segment.

In certain embodiment(s), the update module 204 is configured to meet the condition for updating the position of the start-stop mark when or in response to determining that the to-be-matched voice segment is within the third forward duration interval; and update the initial position of the start-stop mark to a position corresponding to an end frame of the to-be-matched active segment.

In certain embodiment(s), based on the above embodiment corresponding to FIG. 16, in another embodiment of the sound-picture matching apparatus 20 provided by the embodiments of the present disclosure, the acquisition module 202 is further configured to determine, when or in response to determining that the to-be-matched voice segment is not within the target forward duration interval, and the duration of the to-be-matched voice segment is less than the minimum value of the first forward duration, the to-be-matched active segment according to the duration of the to-be-matched voice segment as well as the initial position and a moving radius of the start-stop mark; or the acquisition module 202 is further configured to determine, when or in response to determining that the to-be-matched voice segment is not within the target forward duration interval, and the duration of the to-be-matched voice segment is less than the minimum value of the first forward duration, the to-be-matched active segment according to the duration of the to-be-matched voice segment and the initial position of the start-stop mark.

In certain embodiment(s), based on the above embodiment corresponding to FIG. 16, in another embodiment of the sound-picture matching apparatus 20 provided by the embodiments of the present disclosure, the sound-picture matching apparatus 20 further includes a determination module 206 and a division module 207.

The acquisition module 202 is further configured to acquire, when or in response to determining that the to-be-matched voice segment is not within the target forward duration interval, and the duration of the to-be-matched voice segment is greater than the maximum value of the first forward duration, a kth active segment from the image sequence, where k is an integer greater than or equal to 1 and less than or equal to N.

The determination module 206 is configured to determine a minimum value of a third forward duration according to the maximum scaling, the initial position of the start-stop mark, and a start frame of the kth active segment.

The determination module 206 is further configured to determine a maximum value of the third forward duration according to the minimum scaling, the initial position of the start-stop mark, and an end frame of a (k+1)th active segment.

The determination module 206 is further configured to determine a fourth forward duration interval according to the minimum value of the third forward duration and the maximum value of the third forward duration.

The determination module 206 is further configured to determine, when or in response to determining that the to-be-matched voice segment is within the fourth forward duration interval, a duration of the to-be-matched active segment according to the initial position of the start-stop mark, the maximum scaling, and the start frame of the kth active segment.

The division module 207 is configured to divide, according to the duration of the to-be-matched active segment, the to-be-matched voice segment into a first voice segment and a second voice segment, where a duration of the first voice segment is consistent with the duration of the to-be-matched active segment, and the second voice segment is used for matching a corresponding action segment according to the updated initial position of the start-stop mark.

In certain embodiment(s), the update module 204 is configured to meet the condition for updating the position of the start-stop mark when or in response to determining that the to-be-matched voice segment is within the fourth forward duration interval; and update the initial position of the start-stop mark to a position corresponding to the start frame of the kth active segment.

In certain embodiment(s), based on the above embodiment corresponding to FIG. 16, in another embodiment of the sound-picture matching apparatus 20 provided by the embodiments of the present disclosure, the acquisition module 202 is configured to, when or in response to determining that the moving direction of the start-stop mark is a reverse direction, and the initial position of the start-stop mark is greater than or equal to a start frame of a pth active segment, determine a minimum value of a first reverse duration according to a minimum scaling, the initial position of the start-stop mark, and the start frame of the pth active segment, where p is an integer greater than or equal to 1 and less than or equal to N; determine a maximum value of the first reverse duration according to a maximum scaling, the initial position of the start-stop mark, and an end frame of a (p−1)th active segment; determine a target reverse duration interval according to the minimum value of the first reverse duration and the maximum value of the first reverse duration; and determine, when or in response to determining that the to-be-matched voice segment is within the target reverse duration interval, the to-be-matched active segment according to at least one of the pth active segment and the (p−1)th active segment.

The update module 204 is further configured to update the initial position of the start-stop mark when or in response to determining that a condition for updating the position of the start-stop mark is met.

The adjustment module is further configured to adjust the moving direction of the start-stop mark to be a forward direction when or in response to determining that the updated initial position of the start-stop mark is less than or equal to a position corresponding to a start frame of the first active segment.

In certain embodiment(s), based on the above embodiment corresponding to FIG. 16, in another embodiment of the sound-picture matching apparatus 20 provided by the embodiments of the present disclosure, the acquisition module 202 is configured to determine a minimum value of a second reverse duration according to the initial position of the start-stop mark and the start frame of the pth active segment, where the minimum value of the second reverse duration is greater than the minimum value of the first reverse duration; determine a first reverse duration interval according to the minimum value of the first reverse duration and the minimum value of the second reverse duration; and scale, when or in response to determining that the to-be-matched voice segment is within the first reverse duration interval, a duration between the start frame of the pth active segment and the initial position of the start-stop mark according to a duration of the to-be-matched voice segment to obtain the to-be-matched active segment.

In certain embodiment(s), the update module 204 is configured to meet the condition for updating the position of the start-stop mark when or in response to determining that the to-be-matched voice segment is within the first reverse duration interval; and update the initial position of the start-stop mark to a position corresponding to the start frame of the pth active segment.

In certain embodiment(s), based on the above embodiment corresponding to FIG. 16, in another embodiment of the sound-picture matching apparatus 20 provided by the embodiments of the present disclosure, the acquisition module 202 is configured to determine a maximum value of the second reverse duration according to the initial position of the start-stop mark and an end frame of a (p−1)th active segment, where the maximum value of the second reverse duration is less than the maximum value of the first reverse duration; determine a second reverse duration interval according to the maximum value of the first reverse duration and the maximum value of the second reverse duration; and scale, when or in response to determining that the to-be-matched voice segment is within the second reverse duration interval, a duration between the end frame of the (p−1)th active segment and the initial position of the start-stop mark according to a duration of the to-be-matched voice segment to obtain the to-be-matched active segment.

In certain embodiment(s), the update module 204 is configured to meet the condition for updating the position of the start-stop mark when or in response to determining that the to-be-matched voice segment is within the second reverse duration interval; and update the initial position of the start-stop mark to a position corresponding to the end frame of the (p−1)th active segment.

In certain embodiment(s), based on the above embodiment corresponding to FIG. 16, in another embodiment of the sound-picture matching apparatus 20 provided by the embodiments of the present disclosure, the acquisition module 202 is configured to determine a minimum value of a second reverse duration according to the initial position of the start-stop mark and the start frame of the pth active segment, where the minimum value of the second reverse duration is greater than the minimum value of the first reverse duration; determine a maximum value of the second reverse duration according to the initial position of the start-stop mark and an end frame of a (p−1)th active segment, where the maximum value of the second reverse duration is less than the maximum value of the first reverse duration; determine a third reverse duration interval according to the minimum value of the second reverse duration and the maximum value of the second reverse duration; and determine, when or in response to determining that the to-be-matched voice segment is within the third reverse duration interval, the to-be-matched active segment according to the initial position of the start-stop mark and the duration of the to-be-matched voice segment.

In certain embodiment(s), the update module 204 is configured to meet the condition for updating the position of the start-stop mark when or in response to determining that the to-be-matched voice segment is within the third reverse duration interval; and update the initial position of the start-stop mark to a position corresponding to a start frame of the to-be-matched active segment.

In certain embodiment(s), based on the above embodiment corresponding to FIG. 16, in another embodiment of the sound-picture matching apparatus 20 provided by the embodiments of the present disclosure, the acquisition module 202 is further configured to determine, when or in response to determining that the to-be-matched voice segment is not within the target reverse duration interval, and the duration of the to-be-matched voice segment is less than the minimum value of the first reverse duration, the to-be-matched active segment according to the duration of the to-be-matched voice segment as well as the initial position and a moving radius of the start-stop mark; or, the acquisition module 202 is further configured to determine, when or in response to determining that the to-be-matched voice segment is not within the target reverse duration interval, and the duration of the to-be-matched voice segment is less than the minimum value of the first reverse duration, the to-be-matched active segment according to the duration of the to-be-matched voice segment and the initial position of the start-stop mark.

In certain embodiment(s), based on the above embodiment corresponding to FIG. 16, in another embodiment of the sound-picture matching apparatus 20 provided by the present disclosure, the acquisition module 202 is further configured to acquire, when or in response to determining that the to-be-matched voice segment is not within the target reverse duration interval and the duration of the to-be-matched voice segment is greater than the maximum value of the first reverse duration, a qth active segment from the image sequence, where q is an integer greater than or equal to 1 and less than or equal to N.

The determination module 206 is further configured to determine a minimum value of a third reverse duration according to a maximum scaling, the initial position of the start-stop mark, and an end frame of the qth active segment.

The determination module 206 is further configured to determine a maximum value of the third reverse duration according to a minimum scaling, the initial position of the start-stop mark, and a start frame of a (q−1)th active segment.

The determination module 206 is further configured to determine a fourth reverse duration interval according to the minimum value of the third reverse duration and the maximum value of the third reverse duration.

The determination module 206 is further configured to determine, when or in response to determining that the to-be-matched voice segment is within the fourth reverse duration interval, a duration of the to-be-matched active segment according to the initial position of the start-stop mark, the maximum scaling, and the end frame of the qth active segment.

The division module 207 is further configured to divide, according to the duration of the to-be-matched active segment, the to-be-matched voice segment into a third voice segment and a fourth voice segment, where a duration of the third voice segment is consistent with the duration of the to-be-matched active segment, and the fourth voice segment is used for matching a corresponding action segment according to the updated initial position of the start-stop mark.

In certain embodiment(s), the update module 204 is configured to meet the condition for updating the position of the start-stop mark when or in response to determining that the to-be-matched voice segment is within the fourth forward duration interval; and update the initial position of the start-stop mark to a position corresponding to the end frame of the qth active segment.

In certain embodiment(s), based on the above embodiment corresponding to FIG. 16, in another embodiment of the sound-picture matching apparatus 20 provided by the present disclosure, the video segment is at least one of a virtual video segment, a synthesized video segment, and an edited video segment; and the start-stop mark is a cursor or a slide bar.

Figure 17:
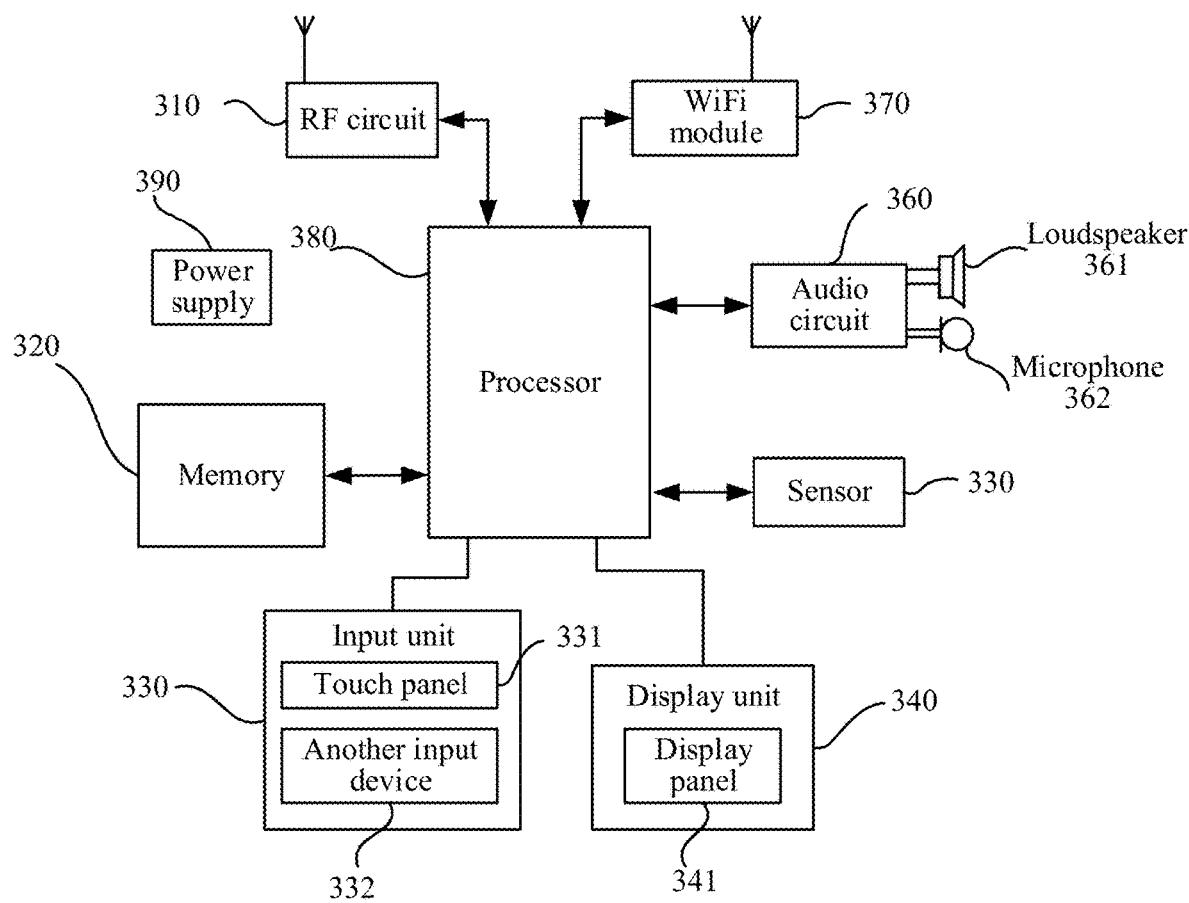
FIG. 17 is a schematic diagram of an embodiment of a terminal device according to embodiment(s) of the present disclosure.

The embodiments of the present disclosure further provide a terminal device, on which a sound-picture matching apparatus may be deployed, as shown in FIG. 17. For the convenience of description, only the part related to the embodiments of the present disclosure is shown, and for specific technical details that are not disclosed, reference may be made to the method part of the embodiments of the present disclosure. The terminal device may be any terminal device, including a mobile phone, a tablet computer, a personal digital assistant (PDA), a point of sales (POS), and an in-vehicle computer. For example, the terminal device is a mobile phone.

FIG. 17 is a block diagram of a partial structure of a mobile phone related to a terminal device according to an embodiment of the present disclosure. Referring to FIG. 17, the mobile phone includes components such as: a radio frequency (RF) circuit 310, a memory 320, an input unit 330, a display unit 340, a sensor 350, an audio circuit 360, a wireless fidelity (Wi-Fi) module 370, a processor 380, and a power supply 390. A person skilled in the art can understand that the structure of the mobile phone shown in FIG. 17 does not constitute a limitation to the mobile phone, and the mobile phone may include more components or fewer components than those shown in the figure, or some components may be combined, or a different component deployment may be used.

In the embodiments of the present disclosure, the processor 380 included in the terminal device may perform the functions in the embodiments, and details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The embodiments of the present disclosure further provide a computer readable storage medium. The computer readable storage medium stores computer programs which, when run on a computer, cause the computer to perform the operations performed by the sound-picture matching apparatus described in the various embodiments.

The embodiments of the present disclosure further provide a computer program product including programs which, when run on a computer, cause the computer to perform the operations performed by the sound-picture matching apparatus described in the various embodiments.

The embodiments are merely intended for describing the technical solutions of the present disclosure, but not for limiting the present disclosure. Although the present disclosure is described in detail with reference to the embodiments, It is to be understood by a person of ordinary skill in the art that modifications can be made to the technical solutions described in the embodiments, or equivalent replacements can be made to some technical features in the technical solutions, as long as such modifications or replacements do not cause the essence of corresponding technical solutions to depart from the spirit and scope of the technical solutions of the embodiments of the present disclosure.

What is claimed is:

1. A video sound-picture matching method, performed by a computing device, the method comprising:
   acquiring a voice sequence, the voice sequence including M voice segments, and M being an integer greater than or equal to 1;
   acquiring a voice segment from the voice sequence, the voice segment being to any voice segment in the voice sequence;
   acquiring an initial position of a start-stop mark and a moving direction of the start-stop mark from an image sequence, the image sequence including N active segments, each active segment including an action picture of an object, the initial position of the start-stop mark being a start frame of the active segment or an end frame of the active segment and being less than or equal to a start frame of a $j^{th}$ active segment, N being an integer greater than or equal to 1, and j being an integer greater than or equal to 1 and less than or equal to (N+1);

determining an active segment according to the initial position of the start-stop mark, the moving direction of the start-stop mark in a forward direction, and the voice segment, comprising:

determining a minimum value of a first forward duration according to a minimum scaling, the initial position of the start-stop mark, and an end frame of the $j^{th}$ active segment;

determining a maximum value of the first forward duration according to a maximum scaling, the initial position of the start-stop mark, and a start frame of the $(j+1)^{th}$ active segment;

determining a target forward duration interval according to the minimum value of the first forward duration and the maximum value of the first forward duration; and determining, in response to determining that the voice segment is within the target forward duration interval, the active segment according to at least one of the $j^{th}$ active segment and the $(j+1)^{th}$ active segment; and synthesizing the voice segment and the active segment to obtain a video segment, the video segment including the action picture of the object and a voice of the object.

2. The video sound-picture matching method according to claim 1, the method further comprising:

updating the initial position of the start-stop mark in response to determining that a condition for updating the position of the start-stop mark is met; and adjusting the moving direction of the start-stop mark to be a reverse direction in response to determining that the updated initial position of the start-stop mark is greater than or equal to a position corresponding to an end frame of an $N^{th}$ active segment.

3. The video sound-picture matching method according to claim 2, wherein determining the active segment comprises:

determining a minimum value of a second forward duration according to the initial position of the start-stop mark and the end frame of the $j^{th}$ active segment, wherein the minimum value of the second forward duration is greater than the minimum value of the first forward duration;

determining a first forward duration interval according to the minimum value of the first forward duration and the minimum value of the second forward duration; and scaling, in response to determining that the voice segment is within the first forward duration interval, a duration between the initial position of the start-stop mark and the end frame of the $j^{th}$ active segment according to a duration of the voice segment to obtain the active segment; and the updating the initial position of the start-stop mark comprises:

meeting the condition for updating the position of the start-stop mark in response to determining that the voice segment is within the first forward duration interval; and updating the initial position of the start-stop mark to a position corresponding to the end frame of the $j^{th}$ active segment.

4. The video sound-picture matching method according to claim 2, wherein determining the active segment comprises:

determining a maximum value of a second forward duration according to the initial position of the start-stop mark and an end frame of the $(j+1)^{th}$ active segment, wherein the maximum value of the second forward duration is less than the maximum value of the first forward duration;

determining a second forward duration interval according to the maximum value of the first forward duration and the maximum value of the second forward duration;

scaling, in response to determining that the voice segment is within the second forward duration interval, a duration between the initial position of the start-stop mark and the start frame of the $(j+1)^{th}$ active segment according to a duration of the voice segment to obtain the active segment; and the updating the initial position of the start-stop mark in response to determining that a condition for updating the position of the start-stop mark is met comprises:

meeting the condition for updating the position of the start-stop mark in response to determining that the voice segment is within the second forward duration interval; and updating the initial position of the start-stop mark to a position corresponding to the start frame of the $(j+1)^{th}$ active segment.

5. The video sound-picture matching method according to claim 2, wherein determining the active segment comprises:

determining a minimum value of a second forward duration according to the initial position of the start-stop mark and the end frame of the $j^{th}$ active segment, wherein the minimum value of the second forward duration is greater than the minimum value of the first forward duration;

determining a maximum value of the second forward duration according to the initial position of the start-stop mark and an end frame of the $(j+1)^{th}$ active segment, wherein the maximum value of the second forward duration is less than the maximum value of the first forward duration;

determining a third forward duration interval according to the minimum value of the second forward duration and the maximum value of the second forward duration;

determining, in response to determining that the voice segment is within the third forward duration interval, the active segment according to the initial position of the start-stop mark and a duration of the voice segment; and the updating the initial position of the start-stop mark in response to determining that a condition for updating the position of the start-stop mark is met comprises:

meeting the condition for updating the position of the start-stop mark in response to determining that the voice segment is within the third forward duration interval; and updating the initial position of the start-stop mark to a position corresponding to the end frame of the active segment.

6. The video sound-picture matching method according to claim 1, further comprising:
determining, in response to determining that the voice segment is not within the target forward duration interval, and a duration of the voice segment is less than the minimum value of the first forward duration, the active segment according to the duration of the voice segment as well as the initial position and a moving radius of the start-stop mark; or,
determining, in response to determining that the voice segment is not within the target forward duration interval, and a duration of the voice segment is less than the minimum value of the first forward duration, the active segment according to the duration of the voice segment and the initial position of the start-stop mark.

7. The video sound-picture matching method according to claim 2, further comprising:
acquiring, in response to determining that the voice segment is not within the target forward duration interval and the duration of the voice segment is greater than the maximum value of the first forward duration, a $k^{th}$ active segment from the image sequence, wherein k is an integer greater than or equal to 1 and less than or equal to N;
determining a minimum value of a third forward duration according to the maximum scaling, the initial position of the start-stop mark, and a start frame of the $k^{th}$ active segment;
determining a maximum value of the third forward duration according to the minimum scaling, the initial position of the start-stop mark, and an end frame of the $(k+1)^{th}$ active segment;
determining a fourth forward duration interval according to the minimum value of the third forward duration and the maximum value of the third forward duration;
determining, in response to determining that the voice segment is within the fourth forward duration interval, a duration of the active segment according to the initial position of the start-stop mark, the maximum scaling, and the start frame of the $k^{th}$ active segment; and
dividing, according to the duration of the active segment, the voice segment into a first voice segment and a second voice segment, wherein a duration of the first voice segment is consistent with the duration of the active segment, and the second voice segment is used for matching a corresponding action segment according to the updated initial position of the start-stop mark; and
updating the initial position of the start-stop mark comprises:
meeting the condition for updating the position of the start-stop mark in response to determining that the voice segment is within the fourth forward duration interval; and
updating the initial position of the start-stop mark to a position corresponding to the start frame of the $k^{th}$ active segment.

8. The video sound-picture matching method according to claim 1, wherein the moving direction of the start-stop mark is a reverse direction, and the initial position of the start-stop mark is greater than or equal to a start frame of a $p^{th}$ active segment, the p being an integer greater than or equal to 1 and less than or equal to N, and determining the active segment comprises:

determining a minimum value of a first reverse duration according to a minimum scaling, the initial position of the start-stop mark, and the start frame of the $p^{th}$ active segment;
determining a maximum value of the first reverse duration according to a maximum scaling, the initial position of the start-stop mark, and an end frame of a $(p-1)^{th}$ active segment;
determining a target reverse duration interval according to the minimum value of the first reverse duration and the maximum value of the first reverse duration;
determining, in response to determining that the voice segment is within the target reverse duration interval, the active segment according to at least one of the $p^{th}$ active segment and the $(p-1)^{th}$ active segment;
the method further comprises:
updating the initial position of the start-stop mark in response to determining that a condition for updating the position of the start-stop mark is met; and
adjusting the moving direction of the start-stop mark to be a forward direction in response to determining that the updated initial position of the start-stop mark is less than or equal to a position corresponding to a start frame of the first active segment.

9. The video sound-picture matching method according to claim 8, wherein
determining the active segment comprises:
determining a minimum value of a second reverse duration according to the initial position of the start-stop mark and the start frame of the $p^{th}$ active segment, wherein the minimum value of the second reverse duration is greater than the minimum value of the first reverse duration;
determining a first reverse duration interval according to the minimum value of the first reverse duration and the minimum value of the second reverse duration; and
scaling, in response to determining that the voice segment is within the first reverse duration interval, a duration between the start frame of the $p^{th}$ active segment and the initial position of the start-stop mark according to a duration of the voice segment to obtain the active segment; and
the updating the initial position of the start-stop mark in response to determining that a condition for updating the position of the start-stop mark is met comprises:
meeting the condition for updating the position of the start-stop mark in response to determining that the voice segment is within the first reverse duration interval; and
updating the initial position of the start-stop mark to a position corresponding to the start frame of the $p^{th}$ active segment.

10. The video sound-picture matching method according to claim 8, wherein
determining the active segment comprises:
determining a maximum value of the second reverse duration according to the initial position of the start-stop mark and an end frame of the $(p-1)^{th}$ active segment, wherein the maximum value of the second reverse duration is less than the maximum value of the first reverse duration;
determining a second reverse duration interval according to the maximum value of the first reverse duration and the maximum value of the second reverse duration; and scaling, in response to determining that the voice segment is within the second reverse duration interval, a duration between the end frame of the $(p-1)^{th}$ active segment and the initial position of the start-stop mark according to a duration of the voice segment to obtain the active segment; and updating the initial position of the start-stop mark comprises:

meeting the condition for updating the position of the start-stop mark in response to determining that the voice segment is within the second reverse duration interval; and updating the initial position of the start-stop mark to a position corresponding to the end frame of the $(p-1)^{th}$ active segment.

11. The video sound-picture matching method according to claim 8, wherein determining the active segment comprises:

determining a minimum value of a second reverse duration according to the initial position of the start-stop mark and the start frame of the $p^{th}$ active segment, wherein the minimum value of the second reverse duration is greater than the minimum value of the first reverse duration;

determining a maximum value of the second reverse duration according to the initial position of the start-stop mark and an end frame of the $(p-1)^{th}$ active segment, wherein the maximum value of the second reverse duration is less than the maximum value of the first reverse duration;

determining a third reverse duration interval according to the minimum value of the second reverse duration and the maximum value of the second reverse duration;

determining, in response to determining that the voice segment is within the third reverse duration interval, the active segment according to the initial position of the start-stop mark and the duration of the voice segment; and updating the initial position of the start-stop mark comprises:

meeting the condition for updating the position of the start-stop mark in response to determining that the voice segment is within the third reverse duration interval; and updating the initial position of the start-stop mark to a position corresponding to a start frame of the active segment.

12. The video sound-picture matching method according to claim 8, further comprising:

determining, in response to determining that the voice segment is not within the target reverse duration interval, and a duration of the voice segment is less than the minimum value of the first reverse duration, the active segment according to the duration of the voice segment as well as the initial position and a moving radius of the start-stop mark; or, determining, in response to determining that the voice segment is not within the target reverse duration interval, and a duration of the voice segment is less than the minimum value of the first reverse duration, the active segment according to the duration of the voice segment and the initial position of the start-stop mark.

13. The video sound-picture matching method according to claim 8, further comprising:

acquiring, in response to determining that the voice segment is not within the target reverse duration interval and the duration of the voice segment is greater than the maximum value of the first reverse duration, a $q^{th}$ active segment from the image sequence, wherein q is an integer greater than or equal to 1 and less than or equal to N;

determining a minimum value of a third reverse duration according to the maximum scaling, the initial position of the start-stop mark, and an end frame of the $q^{th}$ active segment;

determining a maximum value of the third reverse duration according to the minimum scaling, the initial position of the start-stop mark, and a start frame of a $(q-1)^{th}$ active segment;

determining a fourth reverse duration interval according to the minimum value of the third reverse duration and the maximum value of the third reverse duration;

determining, in response to determining that the voice segment is within the fourth reverse duration interval, a duration of the active segment according to the initial position of the start-stop mark, the maximum scaling, and the end frame of the $q^{th}$ active segment; and dividing, according to the duration of the active segment, the voice segment into a third voice segment and a fourth voice segment, wherein a duration of the third voice segment is consistent with the duration of the active segment, and the fourth voice segment is used for matching a corresponding action segment according to the updated initial position of the start-stop mark; and the updating the initial position of the start-stop mark in response to determining that a condition for updating the position of the start-stop mark is met comprises:

meeting the condition for updating the position of the start-stop mark in response to determining that the voice segment is within the fourth forward duration interval; and updating the initial position of the start-stop mark to a position corresponding to the end frame of the $q^{th}$ active segment.

14. The video method according to claim 1, wherein the video segment is at least one of a virtual video segment, a synthesized video segment, and an edited video segment; and the start-stop mark is a cursor or a slide bar.

15. A video sound-picture matching apparatus, comprising: a memory storing computer program instructions; and a processor coupled to the memory and configured to execute the computer program instructions and perform:

acquiring a voice sequence, the voice sequence including M voice segments, and M being an integer greater than or equal to 1;

acquiring a voice segment from the voice sequence, the voice segment being to any voice segment in the voice sequence;

acquiring an initial position of a start-stop mark and a moving direction of the start-stop mark from an image sequence, the image sequence including N active segments, each active segment including an action picture of an object, the initial position of the start-stop mark being a start frame of the active segment or an end frame of the active segment and being less than or equal to a start frame of a $j^{th}$ active segment, N being an integer greater than or equal to 1, and the j being an integer greater than or equal to 1 and less than or equal to (N+1);

determining an active segment according to the initial position of the start-stop mark, the moving direction of the start-stop mark in a forward direction, and the voice segment, comprising:
  determining a minimum value of a first forward duration according to a minimum scaling, the initial position of the start-stop mark, and an end frame of the $j^{th}$ active segment, determining a maximum value of the first forward duration according to a maximum scaling, the initial position of the start-stop mark, and a start frame of the $(j+1)^{th}$ active segment;
  determining a target forward duration interval according to the minimum value of the first forward duration and the maximum value of the first forward duration; and
  determining, in response to determining that the voice segment is within the target forward duration interval, the active segment according to at least one of the $j^{th}$ active segment and the $(j+1)^{th}$ active segment; and
synthesizing the voice segment and the active segment to obtain a video segment, the video segment including the action picture of the object and a voice of the object.

16. The video sound-picture matching apparatus according to claim 15,
  wherein the computer program instructions further include:
    updating the initial position of the start-stop mark in response to determining that a condition for updating the position of the start-stop mark is met; and
    adjusting the moving direction of the start-stop mark to be a reverse direction in response to determining that the updated initial position of the start-stop mark is greater than or equal to a position corresponding to an end frame of an $N^{th}$ active segment.

17. The video sound-picture matching apparatus according to claim 16,
  determining the active segment includes:
    determining a minimum value of a second forward duration according to the initial position of the start-stop mark and the end frame of the $j^{th}$ active segment, wherein the minimum value of the second forward duration is greater than the minimum value of the first forward duration;
    determining a first forward duration interval according to the minimum value of the first forward duration and the minimum value of the second forward duration; and
    scaling, in response to determining that the voice segment is within the first forward duration interval, a duration between the initial position of the start-stop mark and the end frame of the $j^{th}$ active segment according to a duration of the voice segment to obtain the active segment; and
  the updating the initial position of the start-stop mark comprises:
    meeting the condition for updating the position of the start-stop mark in response to determining that the voice segment is within the first forward duration interval; and
    updating the initial position of the start-stop mark to a position corresponding to the end frame of the $j^{th}$ active segment.

18. The video sound-picture matching apparatus according to claim 16,
  wherein determining the active segment includes:
    determining a maximum value of a second forward duration according to the initial position of the start-stop mark and an end frame of the $(j+1)^{th}$ active segment, wherein the maximum value of the second forward duration is less than the maximum value of the first forward duration;
    determining a second forward duration interval according to the maximum value of the first forward duration and the maximum value of the second forward duration;
    scaling, in response to determining that the voice segment is within the second forward duration interval, a duration between the initial position of the start-stop mark and the start frame of the $(j+1)^{th}$ active segment according to a duration of the voice segment to obtain the active segment; and
  the updating the initial position of the start-stop mark in response to determining that a condition for updating the position of the start-stop mark is met comprises:
    meeting the condition for updating the position of the start-stop mark in response to determining that the voice segment is within the second forward duration interval; and
    updating the initial position of the start-stop mark to a position corresponding to the start frame of the $(j+1)^{th}$ active segment.

19. The video sound-picture matching apparatus according to claim 16,
  determining the active segment includes:
    determining a minimum value of a second forward duration according to the initial position of the start-stop mark and the end frame of the $j^{th}$ active segment, wherein the minimum value of the second forward duration is greater than the minimum value of the first forward duration;
    determining a maximum value of the second forward duration according to the initial position of the start-stop mark and an end frame of the $(j+1)^{th}$ active segment, wherein the maximum value of the second forward duration is less than the maximum value of the first forward duration;
    determining a third forward duration interval according to the minimum value of the second forward duration and the maximum value of the second forward duration;
    determining, in response to determining that the voice segment is within the third forward duration interval, the active segment according to the initial position of the start-stop mark and a duration of the voice segment; and
  the updating the initial position of the start-stop mark in response to determining that a condition for updating the position of the start-stop mark is met comprises:
    meeting the condition for updating the position of the start-stop mark in response to determining that the voice segment is within the third forward duration interval; and
    updating the initial position of the start-stop mark to a position corresponding to the end frame of the active segment.

20. A non-transitory computer-readable storage medium storing computer program instructions executable by at least one processor to perform:
  acquiring a voice sequence, the voice sequence including M voice segments, and M being an integer greater than or equal to 1;

acquiring a voice segment from the voice sequence, the voice segment being to any voice segment in the voice sequence;

acquiring an initial position of a start-stop mark and a moving direction of the start-stop mark from an image sequence, the image sequence including N active segments, each active segment including an action picture of an object, the initial position of the start-stop mark being a start frame of the active segment or an end frame of the active segment and being less than or equal to a start frame of a $j^{th}$ active segment, N being an integer greater than or equal to 1, and the j being an integer greater than or equal to 1 and less than or equal to (N+1);

determining an active segment according to the initial position of the start-stop mark, the moving direction of the start-stop mark in a forward direction, and the voice segment, comprising:

determining a minimum value of a first forward duration according to a minimum scaling, the initial position of the start-stop mark, and an end frame of the $j^{th}$ active segment, determining a maximum value of the first forward duration according to a maximum scaling, the initial position of the start-stop mark, and a start frame of the $(j+1)^{th}$ active segment;

determining a target forward duration interval according to the minimum value of the first forward duration and the maximum value of the first forward duration; and determining, in response to determining that the voice segment is within the target forward duration interval, the active segment according to at least one of the $j^{th}$ active segment and the $(j+1)^{th}$ active segment; and synthesizing the voice segment and the active segment to obtain a video segment, the video segment including the action picture of the object and a voice of the object.

* * * * *